(12) United States Patent
Amar et al.

(10) Patent No.: US 9,876,825 B2
(45) Date of Patent: Jan. 23, 2018

(54) MONITORING USER AUTHENTICITY

(71) Applicant: Amadeus S.A.S., Biot (FR)

(72) Inventors: Virginie Amar, Biot (FR); Jeremie Barlet, Nice (FR); Marc Campora, Valbonne (FR); Joseph El Hayek, Antibes (FR); Romain Peicle, Antibes (FR); Olivier Thonnard, Grasse (FR); Jihane Zouaoui, Roquefort les Pins (FR)

(73) Assignee: Amadeus S.A.S., Biot (FR)

( * ) Notice: Subject to any disclaimer, the term of this patent is extended or adjusted under 35 U.S.C. 154(b) by 43 days.

(21) Appl. No.: 15/015,892

(22) Filed: Feb. 4, 2016

(65) Prior Publication Data
US 2017/0230418 A1    Aug. 10, 2017

(51) Int. Cl.
*H04L 29/06* (2006.01)
(52) U.S. Cl.
CPC .............. *H04L 63/20* (2013.01); *H04L 63/08* (2013.01); *H04L 63/10* (2013.01); *H04L 63/1433* (2013.01); *H04L 67/42* (2013.01)
(58) Field of Classification Search
None
See application file for complete search history.

(56) References Cited

U.S. PATENT DOCUMENTS

| | | | | |
|---|---|---|---|---|
| 7,908,645 | B2* | 3/2011 | Varghese | G06Q 20/341 715/773 |
| 8,418,247 | B2* | 4/2013 | Sinnaya | H04L 63/1416 726/22 |
| 2006/0282660 | A1* | 12/2006 | Varghese | G06Q 20/341 713/155 |
| 2013/0104203 | A1 | 4/2013 | Davis et al. | |
| 2017/0111385 | A1* | 4/2017 | Madhu | H04L 63/1433 |

FOREIGN PATENT DOCUMENTS

WO    2006118968    11/2006

OTHER PUBLICATIONS

Milton et al., "N-Gram-Based User Behavioral Model for Continuous User Authentication", SECURWARE 2014, Eighth International Conference on Emerging Security Information, Systems and Technologies, Nov. 20, 2014, pp. 43-49.

(Continued)

*Primary Examiner* — Amir Mehrmanesh
(74) *Attorney, Agent, or Firm* — Thompson Hine LLP

(57) ABSTRACT

Systems and methods for monitoring user authenticity according to user activities on an application server. A user-modeling process and a user-verification process are performed. In the user-modeling process, a user model is adapted session-by-session to user activities in which the user model includes a plurality of adaptive feature-specific user-behavior models. The user-verification process includes determining a plurality of feature-specific risk-score values, comparing the at least one of the adaptive (Continued)

feature-specific user-behavior models with a respective feature extracted from user activity in the user session on the application server, and determining a total risk-score value indicative of user authenticity by weighting and combining the plurality of feature-specific risk-score values. If the total risk-score value is greater than a given threshold, a corrective action is performed.

21 Claims, 11 Drawing Sheets

(56) References Cited

OTHER PUBLICATIONS

Seo et al., "Masquerade detection based on SVM and sequence-based user commands profile", Proceedings of the ASIACCS, Mar. 20, 2007, pp. 398-400.

Hamed et al., "Layered Security Architecture for Masquerade Attack Detection", Jul. 11, 2012, Network and Parallel Computing; [Lecture Notes in Computer Science; Lect.Notes Computer], Springer International Publishing, Cham, pp. 255-262.

Padhmavathi et al., "A Novel Client Side Intrusion Detection and Response Framework", Sep. 1, 2014 (Sep. 1, 2014), Retrieved from the internet at URL:http://www.ejerm.com/voll spl sep2014/img/A Novel Client Side Intrusion-Detection and-Response Framework. pdf.

Bryant et al., "Poly<2> paradigm: a secure network service architecture", 19th Annual IEEE Computer Security Applications Conference, 2003, Piscataway, NJ, USA, Dec. 8, 2003, pp. 342-351.

Best et al., "Continuous Fraud Detection in Enterprise Systems through Audit Trail Analysis", The Journal of Digital Forensics, Security and Law : JDFSL, Jan. 1, 2009, pp. 39-60.

The National Industrial Property Institute, Search Report and Opinion issued in French Application No. 1650872 dated Dec. 1, 2016.

European Patent Office, Search Report issued in EP Application No. 17 00 0090 dated Jun. 2, 2017.

\* cited by examiner

MONITORING USER AUTHENTICITY

TECHNICAL FIELD

The invention relates generally to computers and computer software and, more particularly, to systems, methods, and computer program products for monitoring user authenticity during user activities on an application server.

BACKGROUND

Service providers may identify possible fraudulent activity based on user and device historical data analysis and a predetermined rule set. User behavior patterns may be compared with predefined rules as part of the user data analysis to identify behavior patterns that are fraudulent.

Improved systems, methods, and computer program products are needed for monitoring user authenticity during user activities on an application server.

SUMMARY

According to an embodiment, a method of monitoring user authenticity during user activities in user sessions on at least one application server is provided. The method is carried out by one or more processors executing instructions stored on a non-volatile memory. The instructions cause the processor, when carried out, to perform a user-modeling process in which an existing user model is adapted to user activities session-by-session. The user model comprises a plurality of adaptive feature-specific user-behavior models. The feature-specific user-behavior models is associated with features indicative of user behavior. The instructions further cause the processor, when carried out, to perform a user-verification process in which a plurality of feature-specific risk-score values are determined and a total risk-score value indicative of user non-authenticity is determined. Each feature-specific risk-score value is determined by comparing the at least one adaptive feature-specific user-behavior model with a respective feature extracted from at least one user activity in a user session on the application server. The total risk-score value is determined by either weighting and combining the plurality of feature-specific risk-score values, or weighting and combining pre-combined risk-score values determined by combining a portion of the plurality of feature-specific risk-score values using Multi-Criteria Decision Analysis (MCDA). If the total risk-score value is greater than a given threshold, a corrective action is performed by (i) signing out the user, (ii) requesting a two-factor authentication from the user, (iii) locking the user, or (iv) initiating an alert function.

According to an embodiment, a server system comprising at least one processor and at least one non-volatile memory comprising at least one computer program with executable instructions stored therein for monitoring user authenticity during user activities in user sessions on at least one application server is provided. The executable instructions, when executed by the at least one processor, cause the at least one processor to perform a user-modeling process in which an existing user model is adapted to user activities session-by-session. The user model comprises a plurality of adaptive feature-specific user-behavior models, and the feature-specific user-behavior models are associated with features indicative of user behavior. The executable instructions, when executed by the at least one processor, further cause the at least one processor to perform a perform a user-verification process in which a plurality of feature-specific risk-score values are determined and a total risk-score value indicative of user non-authenticity is determined. Each feature-specific risk-score value is determined by comparing the at least one adaptive feature-specific user-behavior model with a respective feature extracted from at least one user activity in a user-session on the application server associated with said at least one feature. The total risk-score value is determined by either weighting and combining the plurality of feature-specific risk-score values, or weighting and combining pre-combined risk-score values determined by combining a portion of the plurality of feature-specific risk-score values using Multi-Criteria Decision Analysis (MCDA). If the total risk-score value is greater than a given threshold, a corrective action is performed by (i) signing out the user, (ii) requesting a two-factor authentication from the user, (iii) locking the user, or (iv) initiating an alert function.

According to another embodiment, a method is provided for monitoring user authenticity during user activities in user sessions on at least one application server. The method is carried out in a distributed manner by a distributed server system that includes the at least one application server and at least one user-model server. The application and user-model servers comprise at least one processor and at least one non-volatile memory including at least one computer program with executable instructions stored therein. When the processors execute the instructions, the instructions cause the processors to perform a user-modeling process in which an existing user model is adapted to user activities session-by-session, and to perform a user-verification process. The user-verification process includes comparing the user model with features extracted from user activity in the user session on the application server, and determining a total risk-score value on the basis of the comparison. If the total risk-score value exceeds a given threshold, a corrective action is performed by (i) signing out the user, (ii) requesting a two-factor authentication from the user, (iii) locking the user, or (iv) initiating an alert function. User-activity data is transferred from the at least one application server to the at least one user-model server, and adapted-user-model data is transferred from the at least one user-model server to the at least one application server. The user-modeling process is performed on the at least one user-model server, and the user model is adapted based on the user-activity data transferred from the at least one application server. The user-verification process is performed on the at least one application server, and the user-verification process is performed using the adapted-user-model data transferred from the user-model server.

BRIEF DESCRIPTION OF THE DRAWINGS

The accompanying drawings, which are incorporated in and constitute a part of this specification, illustrate various embodiments and, together with the general description given above, and the detailed description of the embodiments given below, serve to explain the embodiments. Similar reference numbers generally indicate identical or functionally similar elements.

DETAILED DESCRIPTION

Figure 1:
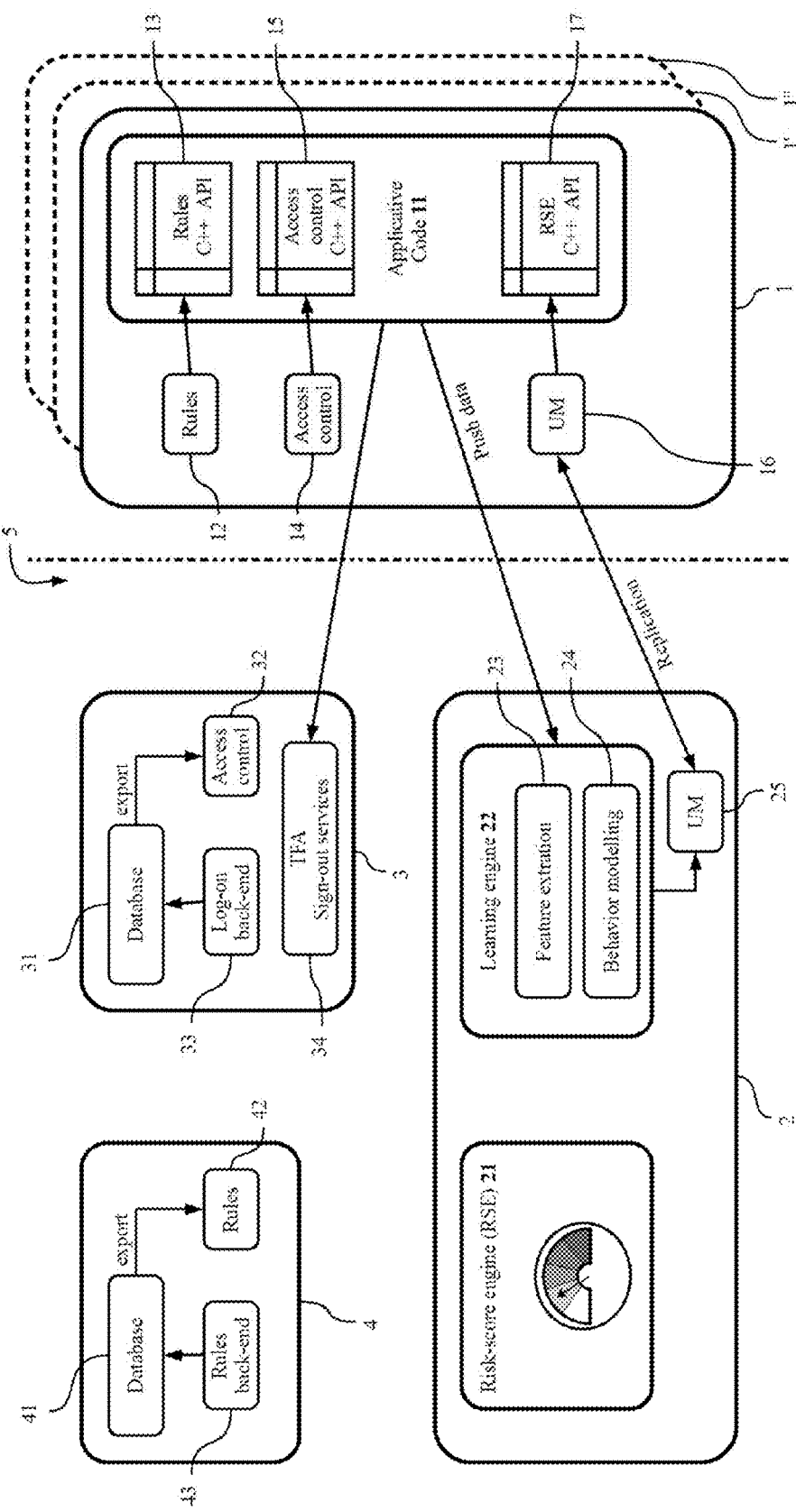
FIG. 1 is a schematic overview of an exemplary distributed server system carrying out an exemplary method of monitoring user authenticity.

A schematic overview of an exemplary distributed server system 5 that is arranged to perform an exemplary method of monitoring user authenticity is illustrated in FIG. 1. The servers 1, 1', 1", 2, 3, and 4 each comprise one or more processors and non-volatile memory containing one or more computer programs with executable instructions stored therein for a method of monitoring user authenticity during user activities in a user session on the at least one application server 1, 1', 1". The vertical dotted line illustrates a physical, i.e., spatial, separation of the application server 1 from the other servers 2, 3, and 4. The executable instructions, when executed by the processor(s) of any one of the servers 1, 2, 3, or 4 cause the processors of the servers 1, 2, 3, 4 to perform the exemplary methods described hereinbelow.

A daemon (not shown), running on the at least one application server 1, 1', 1", pushes application-log data 60 to a learning engine 22, being executed on a user model server 2. The application log data 60 comprises information about the activities the user performs on the application(s) that are given by application code 11.

The method described can be performed for a plurality of different applications 11 running on a single application server 1 or for a plurality of different applications 11, each running on a different server 1, 1', 1" or a combination thereof. For the sake of simplicity, the method is described in this description of embodiments for one application server 1 and activities a user performs on one application 11 *r* functions, acts, and/or operations running on this application server 1.

The user-model server 2 is connected to the application server 1 via a network, such as the internet, a local-area network (LAN), or a metropolitan-area network (MAN), wide-area network (WAN) or the like. The learning engine 22 comprises a feature-extraction module 23 and a behavior-modeling module 24. The feature-extraction module 23 parses the application-log data 60 using various automatic log-parsing techniques, in order to extract features relevant for adapting an existing user model 25, residing on the user-model server 2. The extracted features may comprise a sequence of actions performed by the user, user information 81, such as office or organization information, time information 82 in form of connection times, i.e., the time-stamp of the user-connect request, session durations 83, client information 84 and origins 85 of the user requests.

Figure 3A:
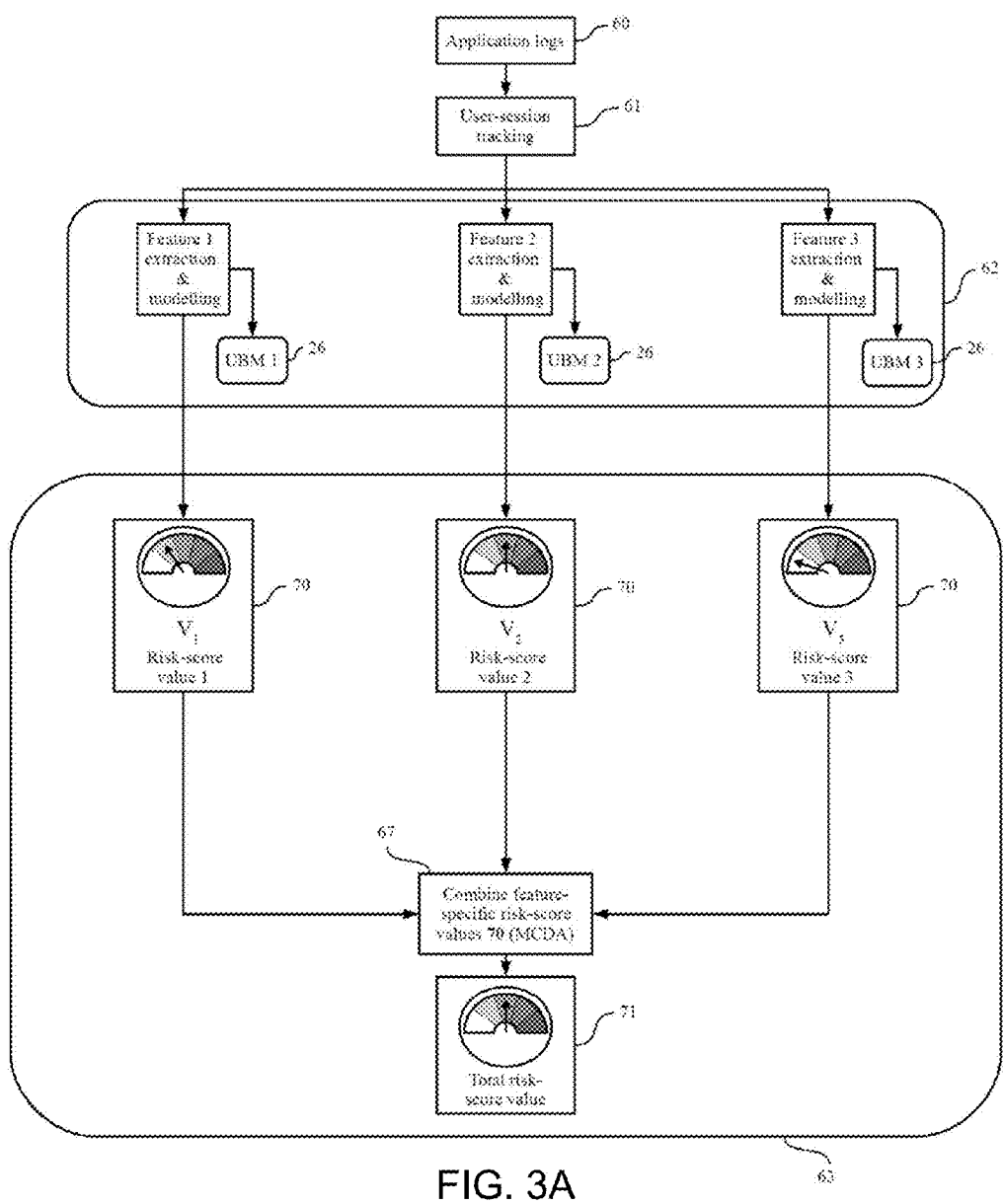
FIG. 3A is a schematic block diagram of an exemplary method of monitoring user authenticity with a single feature-specific risk-score value for each feature and a one-step combination of the feature-specific risk-score values using MCDA techniques.
Figure 3B:
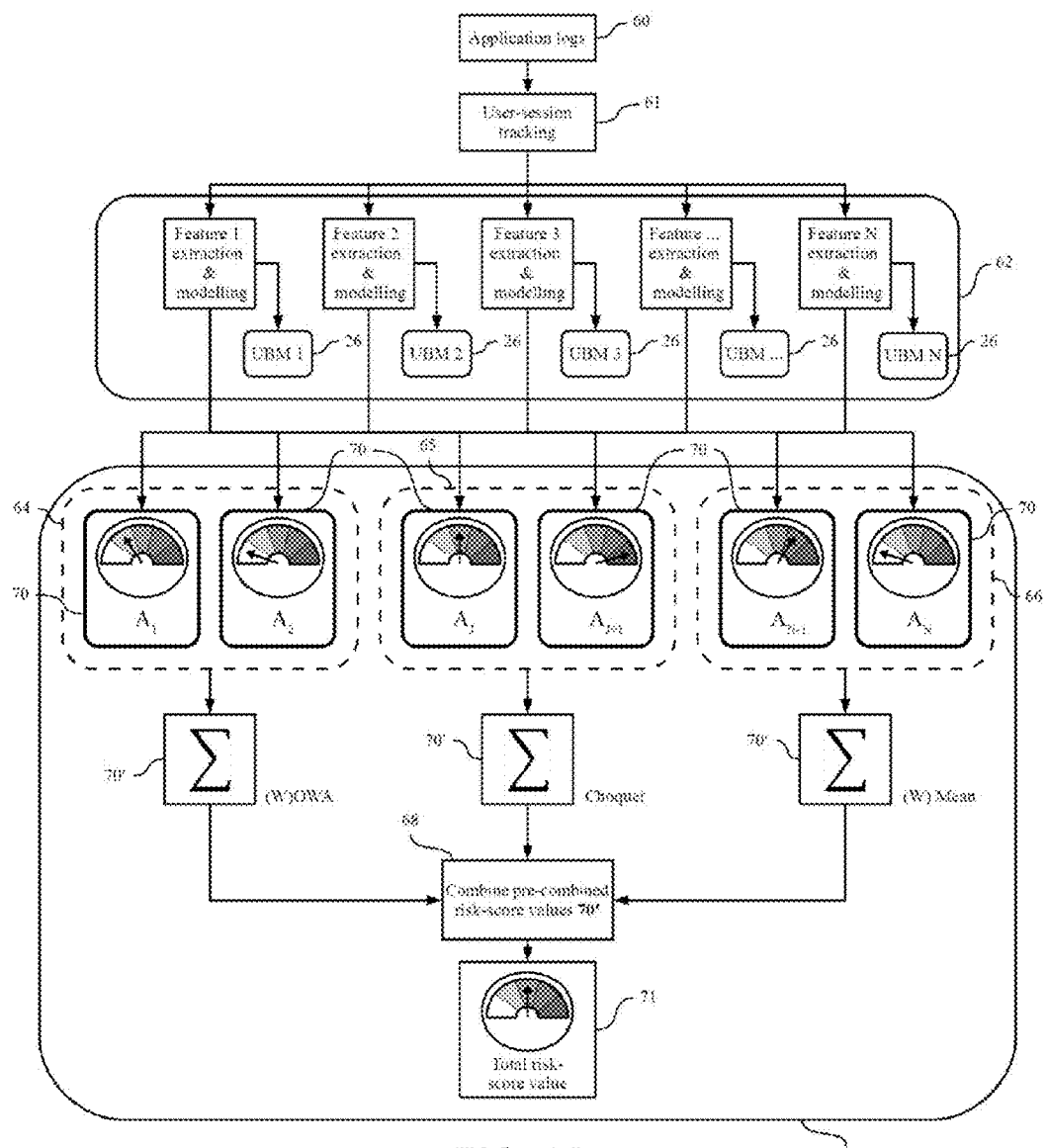
FIG. 3B is a schematic block diagram of an exemplary method of monitoring user authenticity with a single feature-specific risk-score value for each feature and a two-step combination of the feature-specific risk-score values using a MCDA technique.

The extracted features are transmitted to the behavior-modeling module 24 that adapts the existing user model 25 according to the extracted features. The existing user model 25 is adapted by adapting feature-specific user-behavior models 26 associated with the extracted features, as shown in FIGS. 3A and 3B. The feature-specific user-behavior models 26 are further used as an input for a risk-score engine 21, also residing on the user-model server 2. The risk-score engine 21 is adapted to the feature-specific user-behavior models 26 by adapting, for example, a weight of feature-specific risk-score values 70 in a multi-criteria-decision-analysis (MCDA) technique for combining the feature-specific risk-score values 70 to a single total risk-score value 71. The feature-specific risk-score values 70 are obtainable on the basis of the feature-specific user-behavior models 26.

Both the (adapted) user model 25 and the (adapted) risk-score engine 21 are replicated on the application side, i.e., copied from the user-model server 2 to the application server 1 over the network. On the application side, i.e., the right-hand side of the vertical dotted line in FIG. 1, the latest user activity is recorded in a journal. The replicated risk-score engine 17 compares the features extracted from this journal with the replicated user model 16, more precisely, with the feature-specific user behavior models 26 comprised by the replicated user model 16. In this way, the replicated risk-score engine 17 obtains feature-specific risk-score values 70 and combines them according to the weight of these values 70 to a total risk-score value 71.

The total risk-score value 71 is compared to a given threshold by an access-control application 14 that is connected to the application by an access-control-application interface 15. The given threshold is defined in a rules cache 12, replicated from a rules cache 42, originally built on a rules server 4. When the total risk-score value 71 exceeds the given threshold from the rules cache 12, the access—control application 14 triggers a corrective action 72 that is pre-defined in the rules cache 12. The corrective action 72 depends on the actual value of the total risk-score value 71, and hence, on the threshold exceeded. The triggered corrective action 72 may be carried out by a corrective-action module 34 on a logon-and-security server 3. The corrective action 72 is one of (i) signing out the user, (ii) requesting a two-factor authentication from the user, (iii) locking the user, and (iv) initiating an alert function. To provide an example, there are three thresholds each corresponding to a different corrective action 72. If the total risk-score value 71 is above a first threshold a two-factor authentication is requested from the user, if the total risk-score value 71 is above a second threshold the user is signed out, whereas when the total risk-score value 71 is above a third threshold the user is locked.

However, the corrective action 72 can also be triggered by the access-control application 14, when a certain feature pattern is detected in the user activities that corresponds to a predefined feature pattern stored in the rules cache 12. Thereby, some actions of the user cause a certain corrective action 72, regardless of the total risk-score value 71. The predefined feature patterns may be defined by a risk-analysis technician on the rules server 4 and exported to the rules cache 12 on the application server 1 after the definition of the feature pattern.

If the total risk-score value 71 is below the given thresholds, no corrective action 72 is applied and a new log data 60, comprising logged activities of the user during the user session is transmitted to the learning engine 22 at the end of the session, i.e., when the user has logged out from the application. The user model 25 is again adapted to features extracted from the log data 60 as described above. In this way, user authenticity is verified and the user model 25 as well as the risk-score engine 21 are adapted to the activities of the user in a user session on a session-by-session basis.

Figure 2:
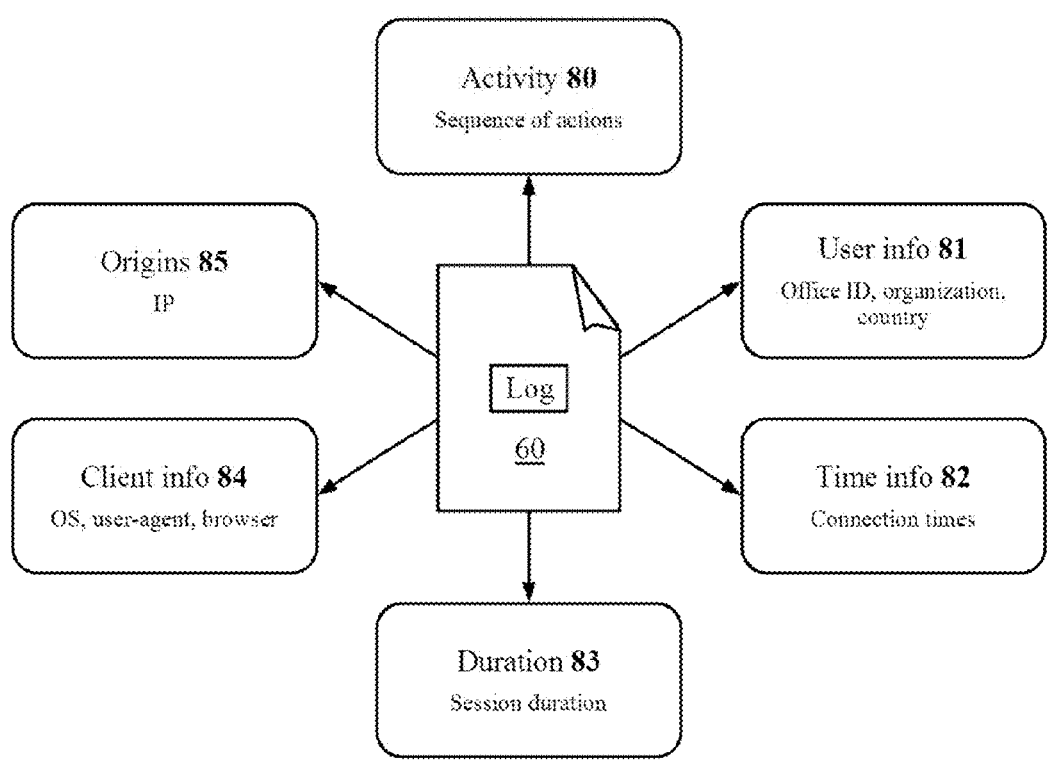
FIG. 2 schematically illustrates a feature extraction from an application specific log file.

A schematic feature extraction from an application-specific log file 60 is illustrates in FIG. 2. Features are extracted from the log data 60' of an application, in which the activities of the user during the user session are recorded. The extracted features comprise, for example, the activities 80 performed by the user, such as a sequence of actions performed by the user. Another example of an extracted feature is user information 81, such as office/organization information, time information 82 in the form of connection times, i.e., the time-stamp of the user-connect request. Furthermore, session durations 83, hence the time passing between a login of the user and a logout of the user, can be extracted from the log file 60 as a feature. Examples for further features are client information 84, such as the type of internet browser used, the type of computer used or the operating system used, etc. and origin 85 of the user requests, for example, given by the IP addresses of the requests or the region an IP address can be associated with.

The features are extracted from the log data 60', for example, by parsing a log file 60 by various parsing algorithms and reconstructing the user session by sequencing the information gathered by the parsing algorithms, so that the parsed information reflects the successive activities performed by the user when using the application. The sequencing can be based on timestamps or on logical conditions linking the actions. Since a user can only pay when he or she has already been redirected to a banking application, this provides an example of such a logical condition. The reconstruction of the user session is hereinafter referred to as user-session tracking 61 (not shown in FIG. 2).

A schematic block diagram of an exemplary method of monitoring user authenticity with a single risk-score value for each feature and a one-step combination of feature-specific risk-score values 70 using MCDA techniques is shown in FIG. 3A.

In a first activity, application log(s) 60 obtained from one or more applications on the application server 1 are used to reconstruct user session(s) by user-session tracking 61, as described above. In the exemplary method illustrated in FIG. 3A, three different features are extracted:
1. the origin 85 of the user activity, e.g., the IP address of an HTTP request;
2. the time information 82, i.e., connection time stamps of the user;
3. the duration 83, i.e., the user-session duration.

Figure 5:
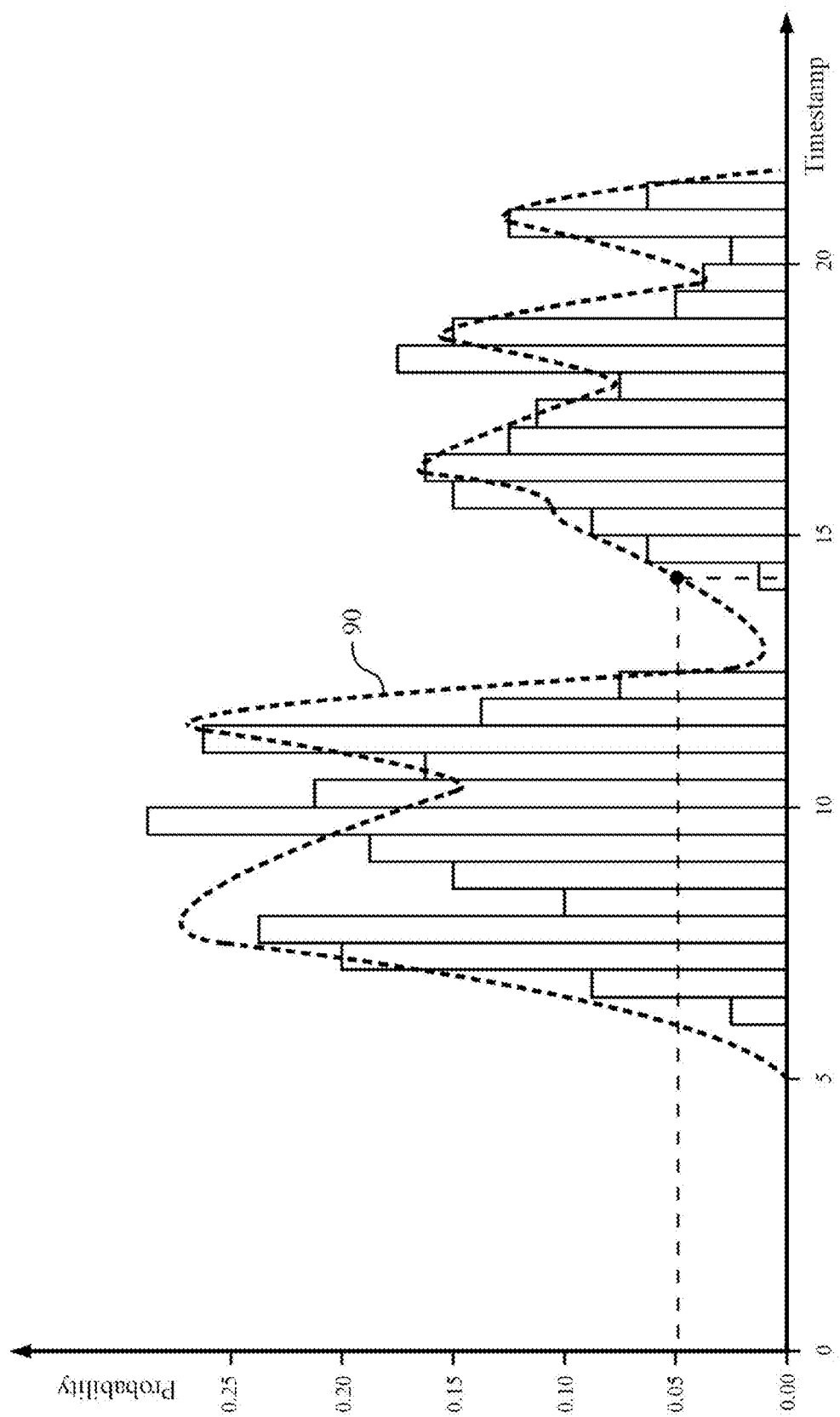
FIG. 5 illustrates a Gaussian-mixture model of a probability distribution of time stamps of user activities.

According to the value of these three exemplary extracted features, the feature-specific user-behavior models 26 associated with these features are adapted. The origin of the user activity may be modeled by associating probabilities to geographical regions, e.g., countries, districts, or the like, according to the frequency the user performs an activity originating from these regions, for example, when the user submits a request from a particular city. The connection time stamps of the user may be modeled by a distribution function, for example, by a Gaussian-mixture model of these time stamps, as shown in FIG. 5. Expected session durations may be modeled by mapping calculated session durations to mean values of session durations, deriving an upper quantile of session durations after finding a probability distribution of session durations, etc.

These feature-specific user-behavior models 26 are adapted to the newly acquired feature values (the feature values extracted from the log data 60') by modifying existing datasets and deriving new distributions on the basis of the new data sets. The result are three adapted feature-specific user-behavior models 26, in FIG. 3A indicated by the boxes "UBM 1", "UBM 2", and "UBM 3".

These feature-specific user-behavior models 26 are used as an input for the risk-score engine 21, shown in FIG. 1. The risk-score engine 21, compares current activities performed by the user in a user session with the feature-specific user-behavior models 26. By this comparison a number indicating a probability that the current user activity is actually not performed by the user to whom the user model 25 belongs and thereby, the probability of a fraud, is generated. These numbers are feature-specific risk-score values 70; one for the connection time stamps (time information 82), one for the origin of the activities (origins 85), and another one for the durations of user sessions (duration 83). These numbers are typically normalized between 0 and These feature-specific risk-score values 70 are combined 67 by a MCDA technique to obtain a total risk-score value 71. For example, a weighted ordered weighted average (WOWA) is used, wherein the feature-specific risk-score value 70 associated with origins of the user activities and the feature-specific risk-score value 70 associated with connection time stamps are weighted twice as high as the feature-specific risk-score value 70 associated with the duration of sessions.

A schematic block diagram of an exemplary method of monitoring user authenticity with a single feature-specific risk-score value 70 for each feature and a two-step combination of the feature-specific risk-score values 70 using a MCDA technique, is shown in FIG. 3B. As described in conjunction with FIG. 3A, feature-specific user behavior models 26 are modeled from of the extracted features.

Figure 4:
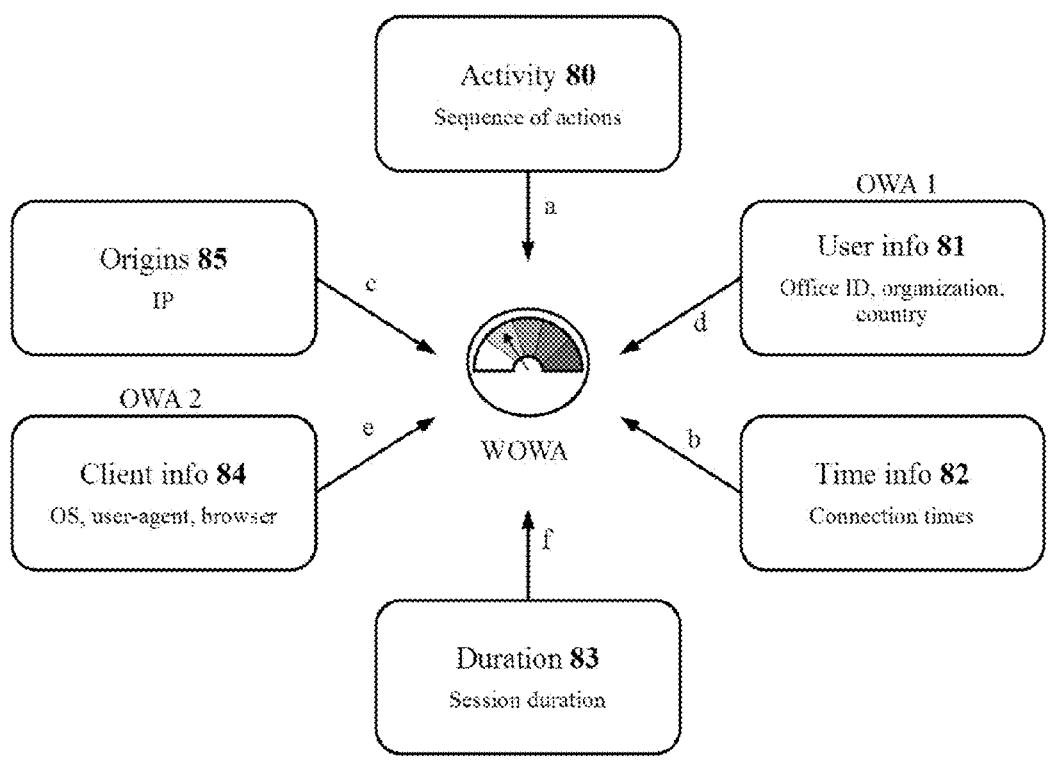
FIG. 4 illustrates the combination of feature-specific risk-score values using a weighted ordered weighted average or an ordered weighted average.

As indicated by arrows connected by a common bar leading to a plurality of feature-specific risk-score values 70, each feature-specific risk-score value 70 associated with a feature-specific user behavior model 26 is calculated by the risk-score engine 17. In the exemplary method illustrated by FIG. 3B, the feature-specific risk-score values 70 are pre-combined to risk-score values 70', i.e., subgroups of functionally related feature-specific risk-score values 70. To provide an example, a feature-specific risk-score value 70 associated with client-specific information, such as the used operating system and a feature-specific risk-score value 70 associated with the used web browser and the computer type used (tablet, personal computer etc.) are pre-combined via an ordered weighted average to a pre-combined risk-score value 70' associated with client information (client info 84), as shown in FIG. 4. Furthermore, for example, the feature-specific risk-score value 70 associated with the origins of the user activity (origins 85) and the feature-specific risk-score value 70 associated with the office or organization identifier are pre-combined to a pre-combined risk-score value 70', associated with origin and office, using a Choquet integral. A third pre-combined risk-score value 70', associated with user-specific connection times and session durations is obtained by calculating a weighted average of the feature-specific risk-score value(s) 70 associated with connection times and the feature-specific risk-score value 70 associated with session duration.

These three exemplary pre-combined risk-score values 70' are combined 68 to a total risk-score value 71 by a MCDA technique, such as a weighted ordered weighted average.

Figure 3C:
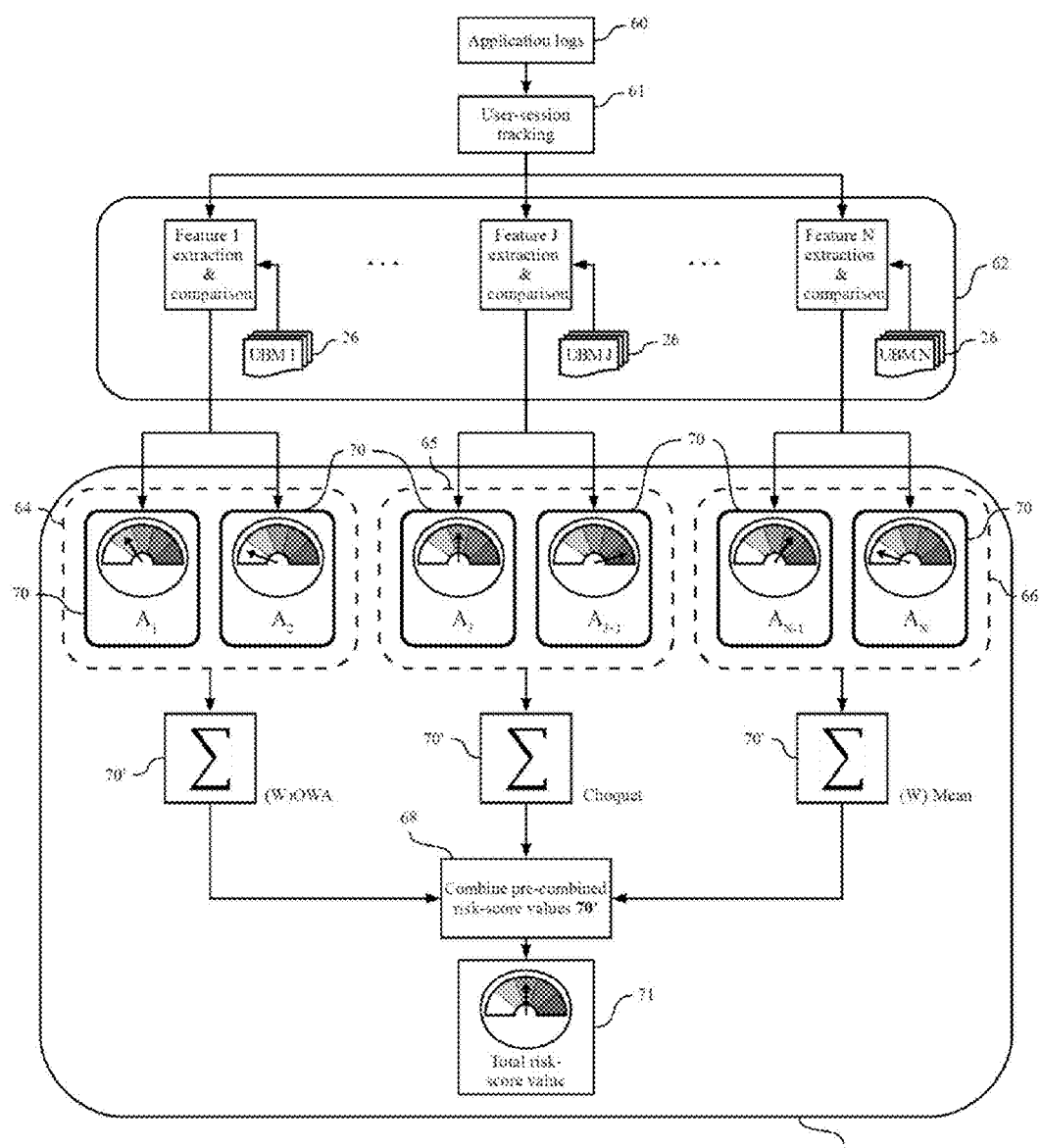
FIG. 3C is a schematic block diagram of the exemplary method of monitoring user authenticity with two feature-specific risk-score values resulting from two different user models for each feature and a two-step combination of feature-specific risk-score values using a MCDA technique.

A schematic block diagram of an exemplary method of monitoring user authenticity with two feature-specific risk-score values 70 resulting from two different feature-specific user-behavior models 26 for each feature and a two-step combination of the feature-specific risk-score values 70 using a MCDA technique is illustrated by FIG. 3C.

In the exemplary method shown in FIG. 3C, feature-specific risk-score values 70 are obtained by applying different statistical methods and/or evaluation models (in the context of FIG. 3C also referred to as feature-specific user-behavior models 26) to certain extracted features. For example, one feature-specific risk-score value 70 is calculated by calculating the difference between a current (extracted) session duration with a mean value of the last 100 session durations, while another feature-specific risk-score value 70 is obtained by comparing the extracted session duration with a median duration, e.g., calculating the difference between the current session duration and the median and the direction of the deviation from the median (to higher values or to lower values). These two feature-specific risk-score values 70 for the session duration are pre-combined to a pre-combined risk-score value 70' associated with the session duration (compare to the feature duration 83). Also, for example, sequences of actions are mapped by two different feature-specific user-behavior models 26 to two different feature-specific risk-score values 70 associated therewith. One feature-specific risk-score value 70 could be obtained by taking the complement of a Markov-probability of the sequence of actions while another feature-specific risk-score value 70 could be obtained by a similarity-based technique, e.g., by calculating the difference between a feature vector containing the currently extracted successive actions to a centroid of previous feature vectors of successive actions. These two feature-specific risk-score values 70 associated with the sequence of actions are pre-combined, e.g., by a Choquet integral, to a pre-combined risk-score value 70'. Also, for example, the origins of the user activities are mapped to two feature-specific risk-score values 70, which are obtained using two different modeling techniques. One model, representing a centroid of the last 100 origins of user requests (here referred to as feature-specific user behavior model 26), may be used to calculate the differences between a current (extracted) origin of user activity and a centroid of the last 100 origins of user requests (representing user activities) and maps it to a feature-specific risk-score value 70. Another model, for example, compares the current (extracted) origin with a statistical distribution of origins of user activities and obtains the feature-specific risk-score value 70 as the complement of the probability of the current origin according to the statistical distribution. These two feature-specific risk-score values 70 may be pre-combined to a pre-combined risk-score value 70' by a weighted average.

The pre-combined risk-score values 70' are then combined 68 to obtain a total risk-score value 71. The individual pre-combined risk-score values 70' may be also weighted before the combination 68.

An exemplary combination of feature-specific risk-score values 70 and/or pre-combined risk-score values 70' to a total risk-score value 71 is illustrated by FIG. 4.

A feature-specific risk-score value 70, associated with a sequence of actions (activity 80), is determined. Also a pre-combined risk-score value 70' associated with user information 81 (office ID, organization identifier, etc.) is determined by a weighted ordered average of feature-specific risk-score values 70 associated with the office ID, the organization identifier, and the country. Furthermore, a feature-specific risk-score value 70 associated with time information 82, in this example connection times, as well as a feature-specific risk-score value 70 associated with duration 83, in this example duration of sessions, is determined. Another ordered weighted average of feature-specific risk-score values 70 associated with the clients' operating system and the clients' browser is determined. This ordered weighted average is a pre-combined risk-score value 70' associated with client info 84. Another feature-specific risk-score value 70 associated with the origins of the user activities (origins 85) is also determined.

The above mentioned feature-specific risk-score values 70 and pre-combined risk-score values 70' are combined to a total risk-score value 71 by a weighted ordered weighted average of these values. The position of the feature-specific risk-score values 70 and pre-combined risk-score values 70' in this weighted ordered weighted average is indicated by letters beneath the arrows leading to the weighted ordered weighted average. Hence, the feature-specific risk-score value 70 associated with the activity 80 with the label "a" is the first summand in the weighted ordered weighted average and the pre-combined risk-score value 70' associated with client info 84 with the label "e" is the last summand in this weighted ordered weighted average.

A Gaussian-mixture model of a probability distribution of timestamps of user activities is given by FIG. 5. The Gaussian-mixture model is an example for a feature-specific user-behavior model 26 associated with the timestamps of user activities. The exemplary user activity evaluated in the diagram of FIG. 5 is a connection time, i.e., the point in time when the user logs onto the application server 1.

The diagram illustrated by FIG. 5 is a timestamp versus probability diagram. The time axis covers 24 hours in total. The probability that a user logs on within a certain 0.5 h interval, e.g., from 20:00 to 20:30 is illustrated by the bars shown in FIG. 5. A Gaussian-mixture model, for example, consisting of a mixture of ten Gaussian distributions with different expectation values and different standard deviations, fitted to the bars, is indicated by the dashed curve covering the bars.

A current login in the time interval between 14:00 and 14:30 is designated by a mark, connected to the timestamp axis and probability axis in the Gaussian-mixture curve. Hence, a probability of 0.05 is associated to this login. The complement of this probability (0.95), for example, can be used as the feature-specific risk-score value 70 associated with the timestamps, e.g., the connection times of the user.

Figure 6:
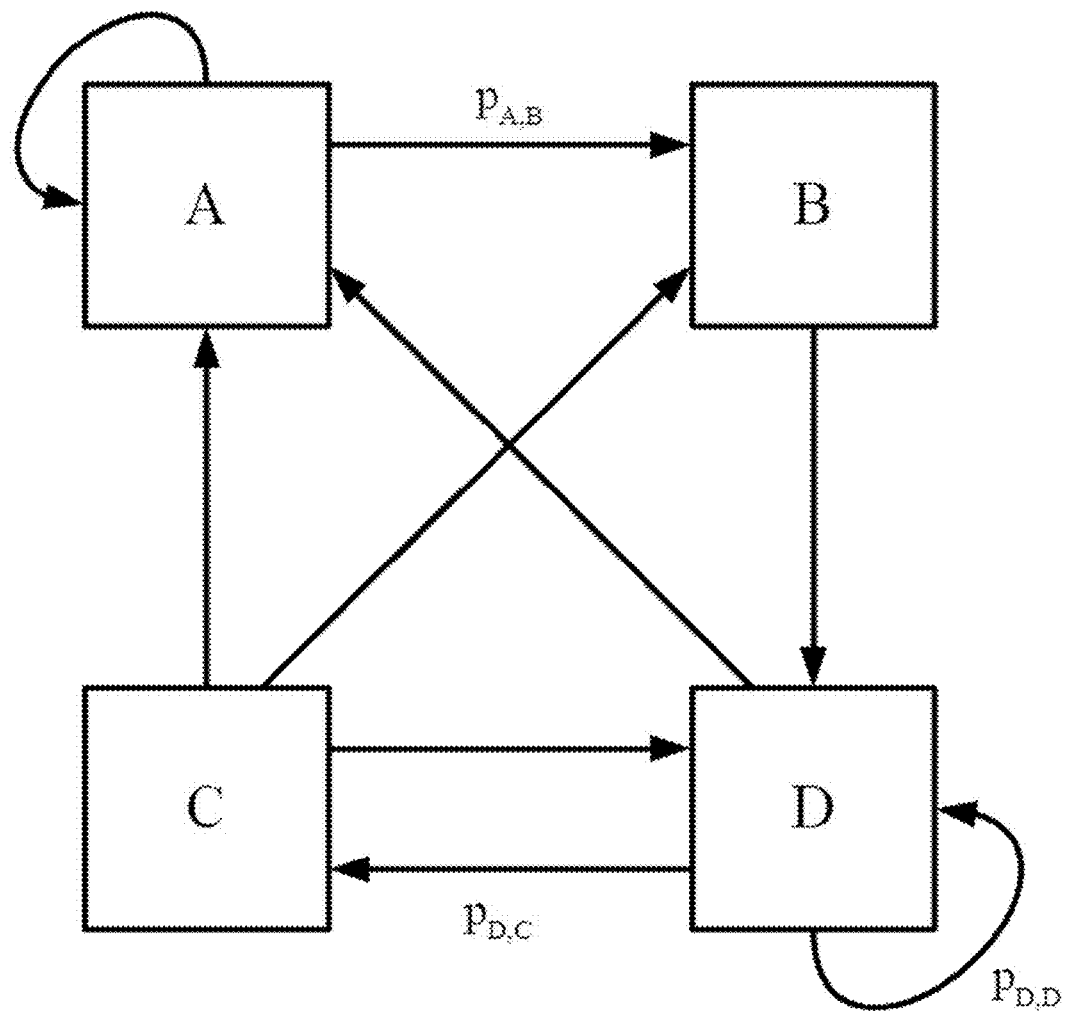
FIG. 6 schematically illustrates a Markov-Chain model of a sequence of actions performed by the user.

An exemplary Markov-Chain model of a sequence of actions (activities 80) performed by the user is illustrated by FIG. 6. Four different states, corresponding to exemplary activities carried out by the user, are illustrated by quadratic boxes "A", "B", "C", and "D". Transitions between these states are indicated by arrows pointing from one state to another. Three exemplary transition probabilities, i.e., the probability that a particular transition is actually carried out, namely "$P_{A,B}$", "$P_{D,C}$", and "$P_{D,D}$" are indicated by respective labels beneath the arrows illustrating the transitions. These transition probabilities, for example, may be "$P_{A,B}$"=0.2, "$P_{D,C}$"=0.4, and "$P_{D,D}$"=0.1.

The state "D", for example, can be a password entry by the user when signing into an application, such as a booking application. A transition probability from the state "D" back to the state "D" therefore corresponds to the probability that the same user re-enters his or her password, e.g., because of a typo. The state "A", for example, may represent a password change, whereas the state "C" may represent a username change. The state "B" may represent a request of sending the user password to the registered email address of the user. The sum of all transition probabilities from one state to one or more other states or to the state itself is unity.

The probability of a certain path of states, e.g., from state "D" to state "A" via state "C" is given by the product of the transition probabilities of the individual transitions "D" to "C" and "C" to "A".

Figure 7:
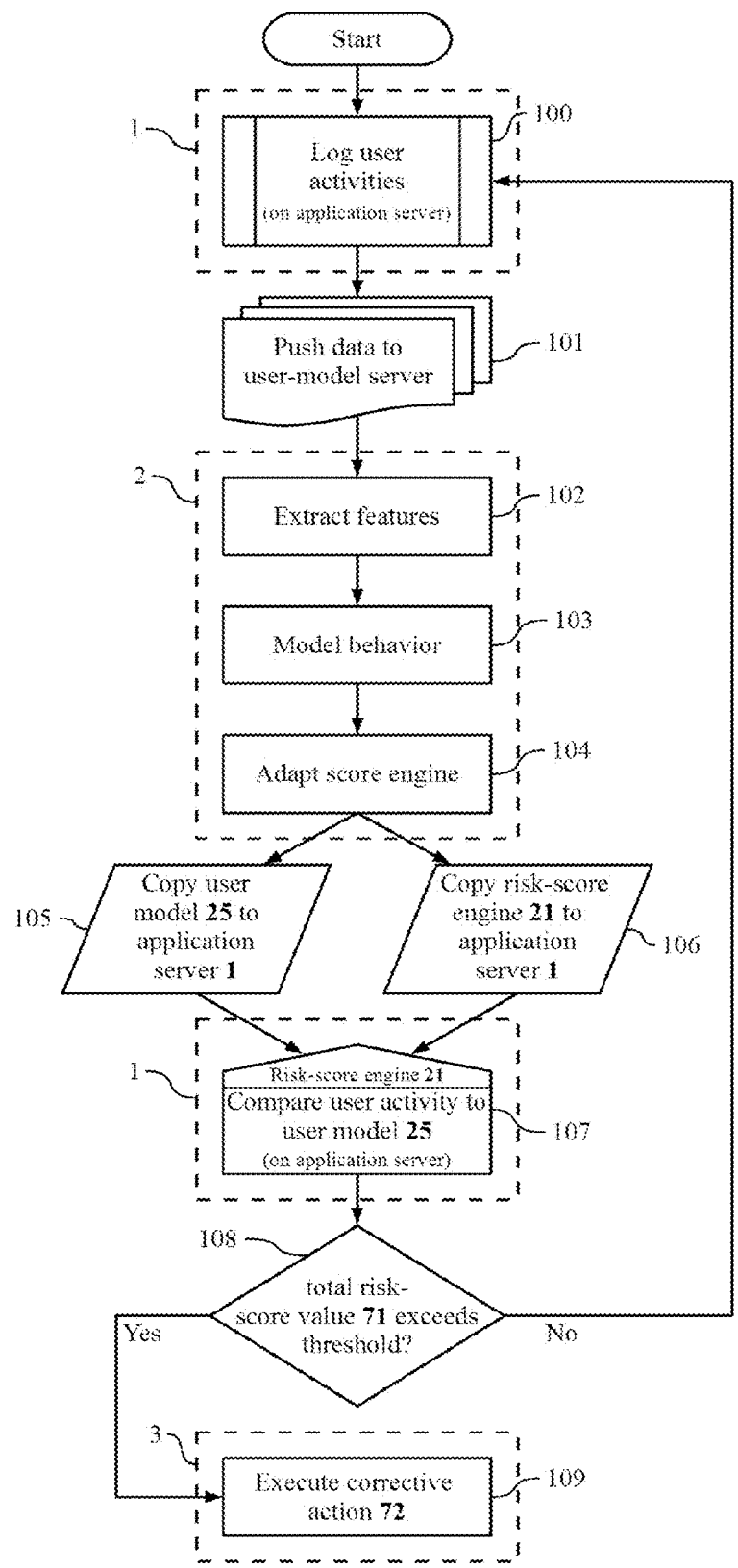
FIG. 7 is a schematic flowchart of an exemplary method of monitoring user authenticity.

An exemplary process flow of an exemplary method for monitoring user authenticity is illustrated in FIG. 7. Dashed rectangular boxes, which surround individual functions, acts, and/or operations of the described process flow (see blocks 100, 102, 103, 104, 107, and 109), indicate a server on which the respective functions, acts, and/or operations are performed. In block 100, user activities on the application server 1 are logged in a log file 60. The log data 60' including the user activities is pushed from the application server 1 to the user-model server 2, as indicated by block 101. On the user-model server 2, three different blocks are performed, namely blocks 102, 103 and 104, as indicated by the dashed rectangular box labeled "2". In block 102, features are extracted from the log data 60' and, in block 103, an existing user model 25 is updated by including the newly extracted features into the user model 25. Also, the risk-score engine 21 is adapted in block 104 by changing the weight of particular feature-specific risk-score values 70 in a calculation formula of the total risk-score value 71, according to the newly acquired feature values. This may be achieved by decreasing the weight of the to-be-determined feature-specific risk-score value 70 (on the application side) associated with the operating system when the extracted feature values indicate that the client computer has been changed.

As indicated by blocks 105 and 106, the adapted user model 25 and the adapted risk-score engine 21 are copied from the user-model server 2 to the application server 1. On the application server 1, the current user activity is kept in a journal and feature values associated with these activities are compared with the respective feature-specific user behavior models 26 by the risk-score engine 21 in block 107. As a result of this comparison, feature-specific risk-score values 70 are obtained and combined to determine a total risk-score value 71, using a MCDA technique. In block 108, the total risk-score value 71 is compared with a given threshold obtained from a rules cache 12 (shown in FIG. 1). So long as the total risk-score value 71 does not exceed the given threshold during a user session, the method of monitoring user authenticity continues by carrying out blocks 100 to 108 at the end of a user session. In response to the total risk-score value 71 exceeding a given threshold during a user session, the execution of a corrective action 72 is demanded by an access-control application 14 on the application server 1. Thereupon, the corrective action 72 is carried out by the corrective-action module 34 on a logon-and-security server 3. Depending on the specific threshold that has been exceeded by the total risk-score value 71, one of the following corrective actions 72 is chosen: (i) signing out the user, (ii) requesting a two-factor authentication from the user, (iii) locking the user, (iv) initiating an alert function.

Figure 8:
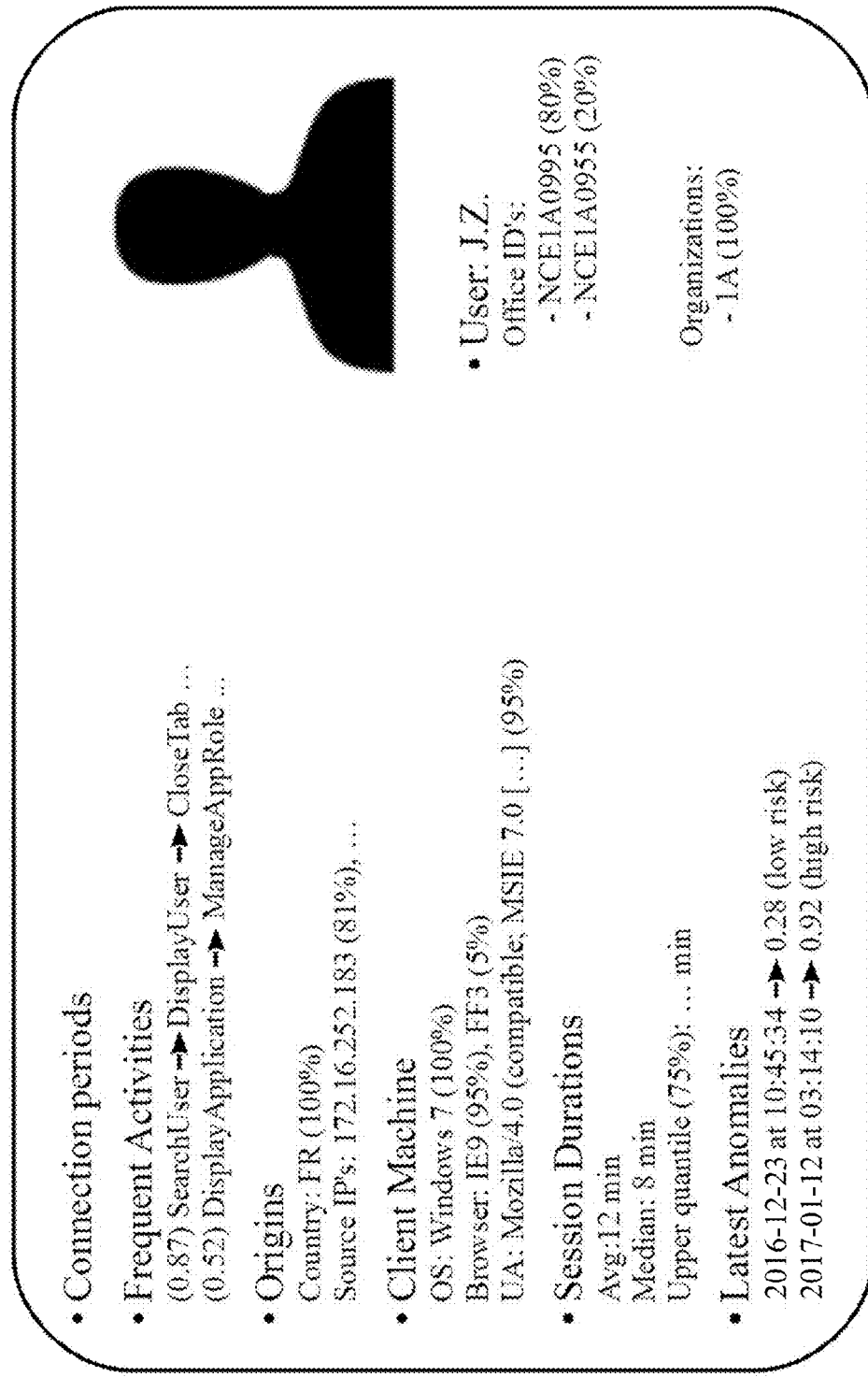
FIG. 8 is a risk profile illustrating a plurality of feature-specific risk-score values and a fraud probability.

A user profile illustrating a plurality of feature-specific user-behavior models 26 yielding a fraud probability is illustrated by FIG. 8. In the user profile shown in FIG. 8, various feature values and probabilities for certain feature values are displayed.

In a first section of the user profile, a feature-specific risk-score value 70 of 0.87, associated with a sequence of actions, is assigned to a first sequence of actions, namely: "Search user"→"Display user"→"Close tab", whereas a feature-specific risk-score value 70 of 0.52 is assigned to a second sequence of actions, namely: "Display application"→"ManageAppRole".

In a second section of the user profile, probabilities associated with the origins 85 of the user activities are displayed. The probability for a user activity of this particular user being issued from France is 100%. The probability that the source-IP for this user is 172.16.252.183 is given as 81%.

In a third section of the user profile, probabilities associated with the client computer used are listed. The probability for a Windows 7® operating system being used is stated to be 100%. The probability that Internet Explorer 9® is used as internet browser by the user is stated to be 95%, whereas the probability that Firefox 3® is used as internet browser is listed to be 5%. Furthermore, the probability that the user agent is Mozilla/4.0® (compatible; MSIE 7.0 . . . ) is obtained to be 95%.

In a fourth section of the user profile, data of the session durations of the user are stated. The average session duration is 18 min, the median of the session durations is 8 min, and also the time in which the session duration is in the upper quantile (in the upper 75% of a probability distribution representing the session durations) is obtained and stored in the user profile.

In a fifth section of the user profile, the probabilities for certain office ID's and certain organizations are obtained and stored. The probability that the user activities have an office ID "NCE1A0995" is 80% whereas the probability that the user activities have an office ID "NCE1A0955" is 20%. The probability that the user activities are associated with the organization "1A" is 100%.

Altogether, when the user profile is compared with current user activities and is evaluated, for example, the user profile yields a total risk-score value 71 of 0.28 (low risk) for the date 2016 Dec. 23 at 10:45:34 and a total risk-score value 71 of 0.92 (high risk) for the date 2017 Jan. 12 at 03:14:10.

Figure 9:
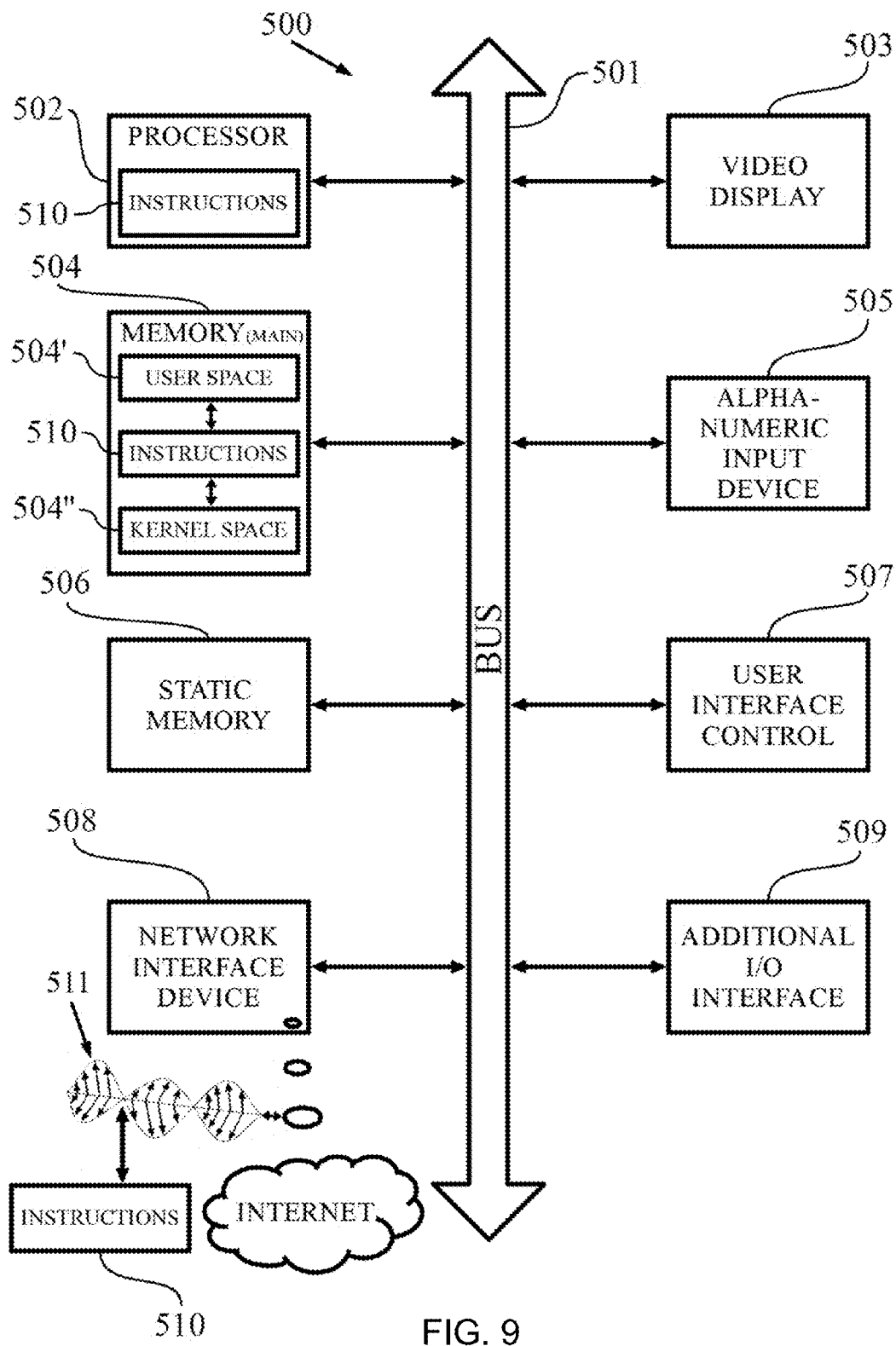
FIG. 9 illustrates an exemplary computer system used for carrying out the method described herein.

A diagrammatic representation of an exemplary computer system 500 is shown in FIG. 9. The computer system 500 is arranged to execute a set of instructions 510, to cause the computer system 500 to perform any of the methodologies used for the method of monitoring user authenticity during user activities in a user session on at least one application server 1, as described herein. The application server 1, the user-model server 2, the logon-and-security server 3, and the rules server 4, for example, are realized as such a computer system 500.

The computer system 500 includes a processor 502, a main memory 504 and a network interface 508. The main memory 504 includes a user space 504', which is associated with user-run applications, and a kernel space 504", which is reserved for operating-system- and hardware-associated applications. The computer system 500 further includes a static memory 506, e.g., non-removable flash and/or solid state drive and/or a removable Micro or Mini SD card, which permanently stores software enabling the computer system 500 to execute functions of the computer system 500. Furthermore, it may include a video display 503, a user interface control module 507 and/or an alpha-numeric and cursor input device 505. Optionally, additional I/O interfaces

509, such as card reader and USB interfaces may be present. The computer system components 502 to 509 are interconnected by a data bus 501.

In some exemplary embodiments the software programmed to carry out the method described herein is stored on the static memory 506; in other exemplary embodiments external databases are used.

An executable set of instructions (i.e., software) 510 embodying any one, or all, of the methodologies described above, resides completely, or at least partially, permanently in the non-volatile memory 506. When being executed, process data resides in the main memory 504 and/or the processor 502.

According to a first aspect, a method of monitoring user authenticity during user activities in user sessions on at least one application server is provided. Monitoring user authenticity in user sessions refers to checking whether a user logged on the application server and using applications running thereon is really the user he or she pretends to be. A user session is the set of all consecutive actions made by a given user after having authenticated in the application using his credentials (i.e., by "logging in"), until the user closes his session by using the de-authentication functionality provided by the application. The method is carried out by one or more processors executing instructions stored on a non-volatile memory. The one or more processors are, for example, processors of an application server and of other servers used to carry out the method. The instructions are typically given by executable computer-program code, the non-volatile memory may be a read-only memory (ROM), an Electrically Erasable Programmable Read-Only Memory (EEPROM), or a flash memory.

The instructions cause the processor(s), when carried out by the processor, to perform a user-modeling process in which an existing user model is adapted session-by-session to user activities. The term "process" with respect to the above mentioned "user-modeling process" and "user-verification process" refers to sub-methods of the method of monitoring user authenticity during user activities in user sessions comprising a plurality of tasks carried out by the processor(s) rather than to single tasks carried out by the processor(s).

The user model may be a mathematical model, particularly a model mapping user behavior, for example, to a probability of a certain activity of the user or values representing this probability. This probability can, for example, be used for verifying user authenticity. The mapping can, for example, be achieved by forming distributions out of recorded user activities representing the user's behavior and calculating standard deviations of this distributions or the like.

The user model is not restricted only to certain behavior-characteristics of the user, such as the access-time to a booking application on the application server or the geographical origin of this access, e.g., from France or from China, but rather may take into account a plurality of such characteristics. Hence, for example, the user model also takes into account the Internet browser that was used for the access in which operating system or client device, just to name some examples. The user model, in this way, reflects a plurality of behavior characteristics that can be analyzed and mapped to such a model by the method described herein.

The existing user model that is adapted can be based on, for example, a user model that was determined during a training phase with an exemplary length of three months or on a user model that was predefined by an administrator on the basis of user-behavior data. The adaption of the existing user model is accomplished session-by-session. In this way, the adaption of the user model can either be accomplished in real time, i.e., during the user-session, or at the beginning or the end of a session.

The user model comprises a plurality of adaptive feature-specific user-behavior models. A feature-specific user-behavior model is associated with a feature indicative of user behavior. These adaptive feature-specific user-behavior models can be seen as sub-models of the user model. One adaptive feature-specific user-behavior model is for example, specific to the feature durations of sessions the user is logged in, for example, in an application, another adaptive feature-specific user-behavior model may be specific for the feature sequence of actions the user performs, as a certain user might have the habit to forget the password of the application but, however, enters the right username. If, for example, this user suddenly types in a wrong user-name repeatedly, this behavior might be suspicious. Another adaptive feature-specific user-behavior model may be specific to the client software and type of client machine used. When a user does not have the habit to use an application from an iPhone® or any other Apple® product, for example, but such a behavior is suddenly detected, this might point to a fraud, as someone might only pretend to be the owner of a certain user profile.

In any case, the adaptive feature-specific user-behavior models are (i) user centric, (ii) adaptive, and (iii) extensible to take new user behavior into account, since user behavior might also change from time to time.

The adaptive feature-specific user-behavior models are, for example, determined based on received user-specific application-log data, which contain complete traces of the user's activities. This can be done regularly when the user has completed a session, i.e., in a post-mortem fashion or by real-time streaming. The data may be transmitted from the applications to a user-model server or any other instance, where building the adaptive feature-specific behavior-models is performed. For polling the log data, for example, a daemon is running on the network node between the user-model server and the application server to continuously poll log-data every 5 to 60 minutes or at the end of a user-session. The transmission of data to the user-model server may be accomplished over the simple network management protocol (SNMP) on network level and on application level by C++ interfaces. The user activities can be reconstructed from the above mentioned log-data. These reconstructed user activities are parsed through at least one data-mining algorithm to extract the features for the different adaptive feature-specific user-behavior models. Examples for such data-mining algorithms are hidden Markov-models, support vector machines or neural networks.

The adaptive feature-specific behavior-model is chosen such that it is appropriate to reflect the features associated with it. A Markov-chain model may be more suitable to model a sequence of actions than a Gaussian-mixture model, whereas the latter is more suitable to model rather the distribution of session-durations or log-in times. Furthermore, for example, origins of requests submitted to an application on the server or the type of internet browser or client computer used are, for example, modeled by pattern-frequency based techniques. Such pattern-frequency based techniques, for example, identify sub-sequences in the users behavior related to client computers or origins of requests and count the number of infrequent sub-sequences in a long-timeframe sequence. Furthermore, the sequences of user actions in an application, for example, when booking a flight, can be analyzed by similarity based techniques, that calculate a distance from a feature-vector representing a sequence of actions, to a centroid of previously recorded feature vectors, obtained from past sequences of actions when, for example, booking a flight. Such a technique, for example, serves as the adaptive feature-specific user-behavior model related to the sequence of actions of a user when using a certain application. These models are adapted, for example, by recalculating the models and taking into account new feature values, each time new user-activity data is transmitted to an adaptive feature-specific user-behavior model calculation module.

Furthermore, not only one method can be applied to create a feature-specific user behavior-model, but rather different feature-specific user behavior models relating to the same feature, e.g., a sequence of actions, can be obtained by analyzing the same feature values by different analyzation methods. To provide an example, a sequence of actions can be mapped to a feature-specific user behavior model realized as a Markov chain model or to a similarity-based model wherein the actions are combined to a feature vector and a centroid of a plurality of such feature vectors is calculated.

Furthermore the instructions cause the processor to perform a user-verification process. The user-verification process comprises determining a plurality of feature-specific risk-score values. A feature-specific risk-score value is a value that quantifies the risk of a certain values of features to be fraudulent, i.e., indicative that the user is actually not the user he or she pretends to be. There may be a feature-specific risk-score value associated with the login times of a user and another feature-specific risk-score value associated with the session duration or the origin of a request.

Determining a feature-specific risk-score value of the plurality of feature-specific risk-score values comprises comparing the at least one adaptive feature-specific user-behavior model with a respective feature extracted from at least one user activity in a user-session on the application-server. To provide an example, a current session duration or a mean-value of the last ten session durations (the session-duration is the feature at question) is compared with the adaptive feature-specific user-behavior model associated with the feature session duration. The deviation between (i) a running average of a plurality of session durations and (ii) the acquired current session duration, e.g., the current time that has passed since the log in of the user, for example, serves as the risk-score value for the feature "session duration".

To provide another example, when sequence of actions is the feature at question, a current sequence of actions performed by the user, such as—first login, then browse ten different flight and hotel options, choosing a five star hotel with a pool and all-inclusive service, and then choose a small city-car to rent and the logout—is compared with the adaptive feature-specific user-behavior model associated with the feature sequence of actions. This comparison may be achieved by calculating a distance of the feature vector built by the above described current sequence of actions to a centroid of a cluster of previous sequences. This distance can, for example, serve as the risk-score value specific to the feature sequence of actions.

When performing the user-verification process, the instructions cause the processor to determine a total risk-score value indicative of user non-authenticity. Determining the total risk-score value comprises a) weighting and combining the plurality of feature-specific risk-score values, or b) weighting and combining pre-combined risk-score values. The pre-combined risk-score values are determined by combining a portion of the plurality of feature-specific risk-score values by relying on Multi-Criteria Decision Analysis (MCDA).

Each risk-score value, taken by itself, is only indicative of user non-authenticity with respect to a certain feature. However, particularly, a single behavior, influencing a single feature might be changed by a user from time to time. To provide an example, if someone uses google-Chrome® as internet browser instead of Microsoft Internet Explorer®, for a certain period of time, this taken alone is little indicative of a fraudulent behavior. Therefore, a combination of a plurality of individual feature-specific risk-score values, forming the total risk-score value is a better applicable risk-measure related to user authenticity.

The individual feature-specific risk-score values can be directly combined to a total risk-score value, e.g., by a sum of weighted individual feature-specific risk-score values. Alternatively, some feature-specific risk-score values that belong to the same class of features, such as features related to client information, can be pre-combined to a pre-combined risk-score value. This pre-combined risk-score value may be built by combining different feature-specific risk-score values related to features contained in the feature-class client information. In this way, for example, the feature-specific risk-score value associated with the internet browser used might be combined with the feature-specific risk-score value associated with the used operating system the one for the computer type to obtain the pre-combined risk-score value associated with client information.

As not every feature might play the same role when it comes down to fraud protection, as some behavior patterns of a user might me more fluctuating than others, i.e., it is more likely for a certain feature to change than for another feature, not every feature-specific risk-score value or pre-combined risk-score value might contribute to the total risk-score value with the same weight.

The weighting of the feature-specific risk-score values or pre-combined risk-score values and the type of combination used is obtained from, for example, fuzzy logic, relative importance, weighted average, ordered weighted average, is for example, chosen by an administrator, such as a fraud expert.

In response to the total risk-score value exceeding a given threshold, a corrective action is performed, wherein the corrective action comprises at least one of (i) signing out the user, (ii) requesting a two-factor authentication from the user, (iii) locking the user, and (iv) initiating an alert function. The corrective action may also involve issuing an alert or raising an alarm.

The total risk-score value is, as described above, the overall indicator of user authenticity. This value, so to say, reflects a deviation of user activities in a user session from the overall user profile. In this way, an exceeding total risk-score value is a strong indication of doubtful user authenticity. The threshold may be set by an administrator. This threshold might also be chosen in a user-specific manner, as there are users who tend to change their habits with respect to, for example, flight booking, more often and such that don't.

In response to exceeding the given threshold, a corrective action is triggered. This corrective action is, one of (i) signing out the user, (ii) requesting a two-factor authentication from the user, (iii) locking the user, and (iv) initiating an alert function. Signing out the user may be logging out the user from the current user session. Requesting a two-factor authentication from the user may be requesting the user to answer a predefined security question, and signing out the user when the answer to the predefined security question is wrong. This security question could be a so called "captcha", or a preselected question coupled to a pre-stored answer of the real user, such as "name of first girlfriend/boyfriend?", "birthplace?", "mother's maiden name?" etc. Locking the user may be deleting a user profile and/or denying access of the user to the application server permanently. Initiating an alert function may be issuing an alert to a human operator, so that he or she can appreciate the situation and take necessary actions.

The type of corrective action triggered depends, for example, on the actual threshold that has been exceeded. To trigger corrective actions of three different types there are, for example, three different thresholds. If the total risk-score value is higher than a first threshold, for example, a two-factor authentication is issued. If the total risk-score value is higher than a second threshold, the user is signed out. If, however, the total risk-score value is higher than a third threshold, the user is locked.

The method of monitoring user authenticity during user activities in a user session on at least one application server combines two processes that complement each other. The first process is a user-modeling process and the second process is a user-verification process. An element of the user-modeling process is the user model that comprises a plurality of adaptive feature-specific user-behavior models. These feature-specific user-behavior models and thereby also the superordinate user model are adapted to user activities, session by session. In this way, the user-modeling process is quasi-continuously adapted to changing user behavior. The feature-specific user-behavior models are leveraged by a second process, namely a user-verification process. The user-verification process is used to obtain a total risk-score value indicative of user non-authenticity on the basis of the quasi-continuously adapted user model. The combination of these two measures allows for a dynamic evaluation of user-authenticity that is also adaptive to every-day-life changes of user behavior and therefore does not trigger any corrective action just because of every-day-life changes of user behavior.

In addition to detecting user impersonation in which an account of a person A is fraudulently used by a person B, the systems and methods described herein can also detect fraudulent behavior in general; for example, if the account of person A is (legitimately) used by person A but in a fraudulent way.

In some embodiments, the user model is adapted on a user-model server on the basis of user activity associated with different applications on the application server.

The user-model server is a server that is connected to the application server via a network node and physically separated from the application server. In this way, computation-power needed to adapt the pre-existing user model to current user activities is externalized, i.e., moved from the application server to the user-model server. The application server delivers user activity data, such as log data from applications, to the user-model server. On the basis of this data the user model adapted to the newly acquired user activities.

The user activity data which is used to determine the user model may be application specific, i.e., associated with different applications on the application server.

In some embodiments, the user model comprises different adaptive feature-specific behavior-models specific for different applications. For example, an adaptive feature-specific user-behavior model is present that is specific for flight booking applications, while there is another adaptive feature-specific user-behavior model specific for car rental applications or the like. Such an implementation is chosen, as one and the same user, might show different session duration, login-time habits for different applications and the feature-specific user-behavior model associated with these features are therefore different for these different applications. Hence, the user model may be made up by different, user-centric and application specific adaptive feature-specific user-behavior models. In turn, also the feature-specific risk-score values derived from these models are application specific in these examples.

In some embodiments, the user model is replicated from the user-model server to the application server, wherein the total risk-score value is determined on the application server using the replicated user model.

A current version of the user model may be replicated to the application-server at the beginning of a user session or on a regular basis, e.g., every day at midnight. This replication may take place by copying the adapted version of the user model from the user-model server to the application server as a whole or by copying only a delta between the adapted user model and the non-adapted version of the user model. The total risk-score value is determined on the basis of the user model as described above. The adaptive feature-specific behavior models, at the application server side, may be directly compared with current user activities recorded in a journal connected to the application(s) and turned into a total risk-score value by the above mentioned techniques applied by a risk-score engine running on the application server. When the risk-score engine determines a total risk-score value that is greater than one or more given thresholds, a corresponding corrective action (e.g., a two-factor authentication) is initiated as described above. The one or more given thresholds are, for example, stored in a rules cache on the application server and are read-out therefrom by the risk-score engine carrying out the comparison.

The corrective action may be performed by an access control on the application server. The access control is therefore, for example, connected to the risk-score engine to trigger such a predefined corrective action, whenever the total risk-score values exceeds a given threshold.

However, the corrective action can also only be triggered by the access control and is then, for example, performed on a logon-and-security server.

In some embodiments, the plurality of features extracted from user activity in the user session comprises at least one of origins of the user activity, time stamps of the activities, and durations of a session in which the activities are performed, and at least one of client information, office information, and organization information.

As already mentioned in the above examples, origins of the user activity, time stamps of the activity, and durations of a session are possible features to be modeled by respective adaptive feature-specific user-behavior models.

The origin of the user activity refers to the country or region from which the request to the application server to carry out the activity was issued. Information about the origin of the request can, for example, be extracted from a "whois record" of the IP address of the request, e.g., a HTTP-request. This "whois record" contains information about the internet service provider (ISPs). From the regional distribution of an ISP the origin of the request can be deduced. If information about which IP addresses are routed by a certain internet service providers over which routers, is available, the origin can be determined even more precisely than by analyzing the regional distribution of ISPs. If the origin of the user request is, for example usually, Germany, more specifically between Munich and Stuttgart, but however is also sometimes located in Sachsen or in Upper-Austria. This data is used to create an adaptive feature-specific user-behavior model associated with the origins of the requests. A distance between a weighted centroid of the area from which requests are usually issued and the origin of the present request might be used as the feature-specific risk-score value, specific to the origin of the request. If the above described user logs onto the application server from Belarus, the specific risk-score value is high and therefore indicative of an ongoing fraudulent behavior.

The origin of the user activity may also refer to the IP addresses of the user-requests, themselves. A feature-specific behavior model of these IP addresses can, for example, be determined by collecting all the IP addresses from which user-requests are received and assigning a specific probability to each IP address. A distance in IP space can be calculated between the IP address of the present request and all other IP addresses from which requests are usually issued, for example taking into account the proximity of two different addresses in IP space by comparing the subnets to which they belong. A weighted average of all IP-based distances can be calculated to reflect the average proximity of the present user IP address to all other addresses from which the user has sent requests, whereby above distances can be weighted according to the relative frequency of occurrence of every IP address.

Also, the time-stamps of user requests when using an application may be used as a feature modeled by an adaptive feature-specific user-behavior model, which is associated with those time stamps. For examples, the time-stamps of a login-request, a request to connect to a certain application, a final-booking request, etc. may be used for such a feature-specific user-behavior model.

Hence, it can be deduced from the adaptive feature-specific behavior model associated with those timestamps, for example, whether the user, for example, connects to certain applications on the application server rather in the early evening, late night, on weekends or during working days, or the like.

From a deviation between a current request time-stamp and the adaptive feature-specific behavior model associated with those timestamps, the respective feature-specific risk-score value is determined.

Furthermore, durations of a user session may be a feature modeled by an adaptive feature-specific behavior model. This provides user authenticity information as a user performs, for example, a flight booking in a certain manner and therefore needs a particular time to perform this task in a flight booking application. Naturally, the time the user needs to perform a banking transaction might be different to the time to perform the task in the flight booking application. Hence, there may be a certain user-session duration with respect to a flight booking application(s) and a user-session duration with respect to banking application(s). These exemplary session durations are then reflected, for example, by two different adaptive feature-specific behavior models pertaining to the two different applications on the basis of which two feature-specific risk-score values associated with session durations are built, one specific for the booking-application(s), one specific for the banking application(s).

Moreover, for example, at least one of client information, office information, and organization information may be used to create feature-specific user-behavior models associated thereto.

Client information may pertain to the specific hard/software used by the user when performing actions in the application(s) on the application server. This may be the internet browser used (Google Chrome®, Microsoft Internet Explorer®, etc.), or the type of computer used (a tablet, a personal computer (PC), smartphone etc.) and the operating system (Android®, iOS®).

Client information can also be provided by user agent, which are particular records identifying the internet browser used of the user in detail.

Office information and organization information may pertain to a static IP address used by a certain company, a hash value associated with user requests identifying the requests to belong to a certain company or organization, or the like. In this way, the user can be identified, for example, as an employee of a certain organization/company etc. by analyzing the requests with respect to these identifiers.

The feature-specific risk-score values associated with client information may be given by a combination of feature-specific risk-score values associated with the internet browser used, the user agent, operating system information and client computer-type information. The feature-specific risk-score value associated with client information is, in this way, rather a pre-combined feature-specific risk-score value but not a total risk-score value.

In some embodiments, a feature-specific behavior-model associated with the timestamps of the actions comprises a Gaussian-mixture model of time stamps of the user activity.

A Gaussian-mixture model is a probabilistic model that assumes all the data points, in this particular case the time stamps, are generated from a mixture of a finite number of Gaussian distributions with unknown parameters. The Gaussian-mixture model may be mathematically given by:

$$P(x) = \sum_{i=1}^{N} \alpha_i G_i(x, \mu_i, \sigma_i)$$

where $\alpha_i$ is a-priory probability that the ith Gaussian distribution $G_i(x, \mu_i, \sigma_i)$, $\mu_i$ is the expectation value of the ith Gaussian distribution and $\sigma_i$ is the standard-deviation of the ith Gaussian distribution and $P(x)$ is the probability of a certain timestamp x.

The expectation values and the standard-deviations of the Gaussian distributions are adapted to time-stamps of the user activity, e.g., a user request, by the user session-by-session as described above and also the above described weights of the Gaussian distributions with these standard-deviations and expectation values. As a result, the feature-specific user behavior-model associated with time stamps of user activities is adapted to user behavior.

In some embodiments, the feature-specific risk-score value associated with the timestamps of the user activities may be calculated by evaluating a complement of the probability of the timestamp extracted from the actions of the user. The complement may be taken from the Gaussian-mixture model.

When the probability of a certain timestamp of a user-activity, for example, a connection request to an application on the application server, is $P(x)$, then the complement of the probability of the time stamp is $1-P(x)$. Thereby, when the probability of a certain timestamp is, e.g., 0.05, normalized from 0 to 1, the feature-specific risk-score value associated to the time stamp is 0.95. Alternatively, an exponential scoring function is used, e.g., Score:

$$s = \exp\left(-\frac{P}{1 - P^\alpha}\right)$$

where P corresponds to $P(x)$ defined above. By tuning the parameter $\alpha$, different scoring models can be obtained.

In some embodiments, the feature-specific behavior-model characterizing the duration of user sessions maps the duration of user sessions to at least one of (i) a moving average, (ii) a median, (iii) a standard-deviation of the user-session duration, (iv) a quantile of the duration of user sessions.

The moving average is given by an average of the last (e.g., 1000) durations of user sessions.

The standard-deviation of a dataset is defined in statistics as the square root of a variance of a data-set or probability distribution, i.e., the averaged squared difference between the expectation value of a random variable, in this case a session-duration, and the actual value of that variable.

The median is the number separating the higher half of a data sample, or a probability distribution from the lower half of the data sample or the probability distribution. If for example a set of user session durations is given by {1.0, 2.0, 5.0, 6.0, 8.0, 12.0, 16.0} minutes, the median is 6.0 min, as it is the central data point of the ordered set.

The quantile is a certain value user duration value dividing a probability distribution into a section to the left of this value and a section to the right of this value. If, for example, a probability distribution of session durations of the user is recorded, it can be deduced from this distribution that 75% of the user session durations are below a certain value, e.g., 8 minutes. In this way if, for example, 80% of the last ten session durations were above this certain value this might be indicative of a fraudulent behavior.

At least one of (i) a moving average, (ii) a standard deviation, or (iii) a median of durations of user sessions (or a combination thereof) may form a feature-specific user-behavior model, which is adapted by taking new session durations into account when calculating the a new moving average, standard-deviation or median.

The quantile may be adapted by taking into account new values when calculating the probability distribution of the user session durations of, e.g., the last 1000 session durations.

In some embodiments, the feature-specific risk-score value associated with the duration of user sessions may be calculated from the difference between the duration of a user session and at least one of (i) a moving average, (ii) a median of durations of user sessions, and/or comparing the duration of a user session with confidence intervals, given by multiples of the standard-deviation.

A difference between a momentary session duration, e.g., the time that has passed since the log-in time of the user, or the duration of the last already closed session, and the moving average of the last (e.g., 100) session durations serves, for example, as the adaptive feature-specific risk-score value associated with the duration of user sessions.

Also in the case that a median is used as feature-specific user-behavior model, the difference or the absolute value difference between a momentary session duration or the duration of the last already closed session and the median of the last (e.g., 100) session durations, serves, for example, as the adaptive feature-specific risk-score value associated with the duration of user sessions.

Also confidence intervals, for example, given by multiples of the standard-deviation of a probability deviation of the session durations ($1\sigma$, $2\sigma$, $3\sigma$), can be used when calculating the feature-specific risk-score value. The probability that a session duration lies within a range (confidence interval) of $\mu \pm 1\sigma$, wherein $\mu$ is the expectation value and $\sigma$ is the standard-deviation, is approximately 68.27%, whereas the probability that a session duration lies within a confidence interval of $\mu \pm 2\sigma$ is 95.45%. Hence, as can be seen from these numbers, the probability that a session duration does not lie within these intervals is 31.73%, or 4.55% respectively. Hence, the complement of these probabilities may be used as the risk-score value. In this way, a session duration value that does not lie within the $\mu \pm 2\sigma$ confidence interval may be with a fraud probability of 95.45% and a risk-score value corresponding thereto.

In some embodiments, the features reflecting the behavior of the user comprise a sequence of actions performed by the user. Hence, the adaptive feature-specific user-behavior model is a model of a sequence of actions performed by the user. An exemplary sequence of actions is given by:
1. login,
2. browse different combined flight and five star hotel options in Greece,
3. choose a five star hotel with a pool and "all-inclusive" service,
4. rent a small city-car
5. pay 1 to 5 min after choosing by advance bank-transaction over bank XY
6. logout from the booking application As sequences of actions when using an application indicate habits of the user they are suitable for user verification purposes. Therefore, for example, such sequences are modeled by a feature-specific user-behavior model.

In some embodiments, the feature-specific behavior-model characterizing the relationship between the individual actions of the sequence of actions is a Markov chain model.

Markov-chain Models model a random system with a plurality of states, in this example an action taken by the user, wherein each of these states has an associated transition probability to another state. The behavior of a user when, for example, booking a flight or a hotel can be seen as such a random system with a plurality of states. In a Markov model, which is a so called "memoryless" model, the transition probabilities from one state to another depend only on the current state, not on the previous states.

The transition probability form a preceding "step A", for example, "browse five star hotels" to succeeding "step B", for example, "book a three star hotel", is for example given by:

$$Pr(X_t=B|X_{t-1}=A)=0.01$$

The total probability of complete sequence of six successive actions, $X_1$ to $X_6$ performed by the user from a time $t=1$ to a time $t=6$, each timestamp being associated with a certain user activity, is, given by:

$$P(X_1, \ldots X_6)=P(X_1)\Pi_{t=2}^{t=6}P(X_{t-1}X_t)$$

where $P(X_1, \ldots X_6)$ is the total probability of the six successive actions, $X_1$ to $X_6$, $P(X_1)$ is the probability that action $X_1$ is performed, $P(X_{t-1}X_t)$ is the transition probability from a step $X_{t-1}$ to a step $X_t$.

Those six actions labeled as $X_1$ to $X_6$ may be the previously described six actions performed by the user when booking a combined hotel and flight offer.

In some embodiments, the feature-specific risk-score value associated with the sequence of actions performed by the user is calculated by determining a complement of the Markov-probability of a given sequence of actions extracted from the actions of the user.

The complement of the Markov-probability, in this context, may be the probability that a certain user does not perform a "step B" after a "step A". If, for example, a user has the habit to pay by advance bank-transaction after a booking a flight, this transition from "book a flight" (step A) to "pay by advance bank-transaction" (step B) the Markov probability of this (partial) sequence might have a value of 0.95. The complement of the Markov probability is 0.05, hence, the feature-specific risk-score value of this sequence of actions is corresponding to this complement and is thereby quite low. However, if another transition with a quite low transition probability is performed, the feature-specific risk-score value is quite high. To provide an example, if usually a user does not ever forget his or her password, a multiple trial to login with (due to not correct password entry), corresponding to a transition probability of a "step A" to the same "step A", is then associated with a high complement of the Markov probability and therefore a high feature-specific risk-score value.

Also the Markov complement of not only a transition probability but the complement of the Markov probability of a certain sequence of actions may be used as a feature-specific risk-score value. When $P(X_1, \ldots X_6)$ is the total probability of six successive actions, the complement of this probability is given by $1-P(X_1, \ldots, X_6)$. Again here high complements correspond to high feature-specific risk-score values.

In some embodiments, the feature-specific risk-score values may be combined by weighting the score values according to their relative fraud probability.

As mentioned above, some feature-specific risk-score values might be more indicative of fraud with respect to user authenticity. To provide an example, an actual login from China, when the user has logged in three hours ago from France is more indicative of a fraud, than, for example, when the user sends a request from another computer with a different IP address than the one he or she usually uses.

In order to take this into account, the feature-specific risk-score values are combined in an adaptive manner to yield a total risk-score value. The feature-specific risk-score values may be weighted according to their relative fraud probability. This weighting of the feature-specific risk-score values and also the type of combination chosen may be defined by a risk-analyst.

Also the threshold with which the total risk-score value is compared may be adapted to the value certain risk-score values. In this way, if certain feature-specific risk-score values exceed an individual threshold, or certain behavior patterns that are either learned by a neuronal network model or predefined are detected, the overall threshold will be decreased, so that the above described corrective action is issued in any case.

By adaptively combining the weight of the feature-specific risk-score values, also synergies between certain criteria, i.e., risk scores associated with certain features, can be taken into account. As in the above example, a high risk-score value associated with time stamp might be high just because somebody is working in the night; however, when also the risk-score value associated with the origin of the request is high, the weighting of these two factors in the combination yielding the total risk-score value might be potentiated, for example, by multiplying them with a certain number close to the threshold or the like.

However, some other feature-specific risk-score values might be redundant, such as when the feature-specific risk-score value associated with the client computer is high, also the feature-specific risk-score value associated with the internet browser is high, as when using another client computer, such as an Android® tablet, it is likely that also another, preinstalled internet browser, such as Google Chrome® is used instead of Microsoft Internet Explorer® that might be the normal preference of the user on a windows-computer.

Hence, in such cases, the weighting of both feature-specific risk-score values might be decreased relative to their standard weighting in the combination yielding the total risk-score value. Also the weighting of such feature-specific risk-score values when being combined to a pre-combined risk-score value may be adjusted in this way.

Also such a rule might be chosen by a risk-analyst or might alternatively be found by automatically monitoring user authenticity (e.g., by iteratively adjusting weighting factors on the basis of a neuronal network model or the like).

A simple way of combining the feature-specific risk-score values is to use to a weighted average of the feature-specific risk-score values. An example of determining the total risk-score value that way is given by:

$$R = \sum_{i=1}^{N} p_i * r_i, \sum_{i=1}^{N} p_i = 1$$

where R is the total risk-score value, $r_i$ are N different feature-specific risk-score values, and $p_i$ are their respective weights.

In some embodiments, the feature-specific risk-score values are combined to yield the total risk-score value using multi-criteria decision analysis (MCDA) by determining, at least one of a weighted ordered-weighted-average and an ordered-weighted average of these values. Ordered weighted averages and weighted ordered weighted averages are tools of MCDA techniques for vague or "fuzzy" environments, i.e., environments in which the transition between two states, for example, fraud or not fraud, are rather blurred than exactly definable.

One possibility of obtaining the total risk-score value is to use an ordered weighted average of the feature-specific risk-score values. The feature-specific risk-score values are, in this way, weighted by their ordering. An ordered weighted average of feature-specific risk-score values to obtain a total risk-score value is given by:

$$R(r_1 \ldots r_N) = WB$$

where R is the total risk-score value, $W=(w_1 \ldots w_N)$ is a vector of weights $w_i$, and $B=(b_1 \ldots b_N)$ is a vector of feature-specific risk-score values $b_i$, ordered according to their magnitude beginning with the greatest risk-score value as element $b_1$. The weights $w_i$ of vector W are in sum one: $\sum_{i=1}^{N} w_i = 1$.

Ordered weighted average (OWA) differs from a classical weighted average in that in the classical weighted average the weights are not associated with position of a particular input in an ordered sequence of inputs, but rather with their magnitude regardless of the position. By contrast, in OWA the weights generally depend on the position of the inputs in an ordered sequence of inputs. As a result OWA can emphasize, for example, the largest, smallest or mid-range values. This enables a risk-analyst to include certain preferences among feature-specific risk-score values, such as "most of" or "at least" k criteria (out of N) to have a significant high value for the total risk-score value to become significant as well.

An ordered sequence of inputs (ordered according to decreasing magnitude) may be referred to as W and represents a list, or "vector" of inputs. As an example, a risk-analyst might want to emphasize two or more significant high feature-specific risk-score values. Hence, the highest weight in $2^{nd}$ position in W is selected. When, for example, assuming $B_1=[0.9, 0.0, 0.0, 0.8, 0.0]$ and $W_1=[0, 1, 0, 0, 0]$ an arithmetic mean value of 0.34 and a corresponding $OWA_w$ value of 0.8 would be obtained. When, in another example, assuming $B_2=[0.2, 1.0, 0.3, 0.2, 0.3]$ and $W_2=[0, 1, 0, 0, 0]$ an arithmetic mean value of 0.40 and a corresponding $OWA_w$ value of 0.3 would be obtained instead. It is apparent that OWA can make a clear difference between these two vectors of feature-specific risk-score values, whereas the arithmetic mean cannot.

Another possibility of obtaining the total risk-score value is to use a weighted ordered weighted average of the feature-specific risk-score values. The feature-specific risk-score values are thereby weighted by their ordering and importance. This aggregation function combines the advantages of both types of averaging functions by enabling the risk-analyst to quantify the reliability of the feature-specific risk score values with a vector P (as the weighted mean does), and at the same time, to weight the values in relation to their relative position with a second vector W (as the OWA operator).

In the following, W and P are two weighting vectors summing up to 1 with the same meaning as used previously for OWA and Weighted Mean, respectively. A weighted ordered weighted average of feature-specific risk-score values to obtain a total risk-score value is given by:

$$R(r_1 \ldots r_N) = UB$$

where R is the total risk-score value, $U=(u_1 \ldots u_N)$ is a vector of weights $u_i$, and $B=(b_1 \ldots b_N)$ is a vector of feature-specific risk-score values $b_i$, ordered according to their magnitude beginning with the greatest risk-score value as element $b_1$. The weights $u_i$ of vector U are again in sum one: $\Sigma_{i=1}^{N} u_i = 1$. The weights of U are obtained through a monotone non-decreasing interpolation function G applied to combinatorial subsets of weighting vector P, whereby the interpolation function G is defined through a set of points bound to weighting vector W. Essentially, the WOWA operator can be seen as an OWA function with the weights which are obtained by combining two weighting vectors W (as used in OWA) and P (as used in Weighted Mean) using a generating function G:

$$U = \text{Func}(W, P)$$

Again, as an example, a risk-analyst might want to emphasize two or more significant high feature-specific risk-score values and at the same time wants to express the relatively higher importance of features #1 and #4. Hence, the highest weight in $2^{nd}$ position in U is selected. If one assumed $B_1=[0.9, 0.0, 0.0, 0.8, 0.0]$, $W_1=[0, 1, 0, 0, 0]$ and $P_1=[0.4, 0.1, 0.1, 0.3, 0.1]$ an arithmetic mean value of 0.34, a weighted mean value of 0.60, and a corresponding $WOWA_{U,B}$ value of 0.90 would be obtained. When, on the other hand, $B_2=[0.2, 1.0, 0.3, 0.2, 0.3]$, $W_2=[0, 1, 0, 0, 0]$, and $P_2=[0.4, 0.1, 0.1, 0.3, 0.1]$ an arithmetic mean value of 0.40, a weighted mean value of 0.30 and a corresponding $WOWA_{U,B}$ value of 0.25 would rather be obtained. It becomes clear that WOWA can make an even greater difference between these two vectors of feature-specific risk-score values. As already stated in conjunction with the examples discussed above, the arithmetic mean provides no clear distinction between the different vectors for the examples shown. A weighted mean (WM) yields better distinction than a normal arithmetic mean to some extent; the WOWA provides an even clearer distinction. In the presented example the difference in weighted mean value is only 0.30, whereas the WOWA separates the two cases by 0.65.

Nevertheless, also other combination techniques in the field of MCDA techniques, such as fuzzy integrals are, for example, applied for obtaining the total risk-score value. Fuzzy integrals, such as Choquet integrals, are suitable to include positive interactions (synergies) and negative interactions (redundancies) between certain subsets of feature-specific risk-score values into the combination of feature-specific risk-score values. Fuzzy integrals are defined with respect to so-called fuzzy measures (or capacities), which are set functions used to define, in some sense, the importance of any subset belonging to the power set of N (the set of features). Fuzzy integrals can be seen as a generalization of all the averaging functions described above.

In some embodiments, in response to a certain feature pattern being detected, a two-factor authentication is requested from the user, or the user is locked, or the user is signed out, or an alert function is initiated regardless of the total risk-score value.

Hence, regardless of the total risk-score value and the underlying statistics, some behavior patterns may cause a related corrective action. These behavior patterns might be defined by a risk-analyst. For example, when somebody repeatedly wants to change his or her username and the password, this raises doubt about the identity of the user and therefore, for example, leads automatically to the request of a two-factor authentication from the user, as this behavior pattern raises doubts about the identity of the user.

According to a second aspect, a server system comprising at least one processor and at least one non-volatile memory comprising at least one computer program with executable instructions stored therein for monitoring user authenticity during user activities in user sessions on at least one application server is provided. The executable instructions, when executed by the at least one processor, cause the at least one processor to perform a user-modeling process in which an existing user model is adapted to user activities session-by-session. The user model comprises a plurality of adaptive feature-specific user-behavior models that are associated with features indicative of user behavior. The executable instructions, when executed by the at least one processor further cause the at least one processor to perform a user-verification process in which a plurality of feature-specific risk-score values are determined. Each feature-specific risk-score value is determined by comparing the at least one adaptive feature-specific user-behavior model with a respective feature extracted from at least one user activity in a user-session on the application server associated with said at least one feature, and determining a feature-specific risk-score value further comprises determining a total risk-score value indicative of user non-authenticity. The total risk-score value is determined by a) weighting and combining the plurality of feature-specific risk-score values, or b) weighting and combining pre-combined risk-score values. The pre-combined risk-score values being determined by combining a portion of the plurality of feature-specific risk-score values. In response to the total risk-score value exceeding a given threshold, a corrective action is performed by at least one of (i) signing out the user, (ii) requesting a two-factor authentication from the user, (iii) locking the user, and (iv) initiating an alert function.

According to a third aspect, a method is provide for monitoring user authenticity during user activities in user sessions on at least one application server. The method is carried out in a distributed manner by a distributed server system including the at least one application server and at least one user-model server. The application and user-model servers comprise at least one processor and at least one non-volatile memory comprising at least one computer program with executable instructions stored therein. The method being carried out by the processors executing the instructions, wherein the instructions cause the processors to perform a user-modeling process in which an existing user model is adapted to user activities session-by-session. The instructions further cause the processors to perform a user-verification process comprising comparing the user model with features extracted from user activity in the user session on the application server, determining a total risk-score value on the basis of the comparison, in response to the total risk-score value exceeding a given threshold. The user-verification process further comprises performing a corrective action by at least one of (i) signing out the user, (ii) requesting a two-factor authentication from the user, (iii) locking the user, and (iv) initiating an alert function, transfer user-activity data from the at least one application server to the at least one user-model server and transfer adapted-user-model data from the at least one user-model server to the at least one application server. The user-modeling process is performed on the at least one user-model server, wherein the user model is adapted based on the user-activity data transferred from the at least one application server. The user-verification process is performed on the at least one application server, wherein the user-verification process is performed using the adapted-user-model data transferred from the user-model server.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A server system for monitoring user authenticity during user activities in user sessions on at least one application server, the server system comprising:
   one or more processors; and
   at least one computer readable storage memory comprising program code that, when executed by the one or more processors, causes the one or more processors to:
   perform a user-modeling process in which a user model is adapted session-by-session to user activities, wherein the user model includes a plurality of adaptive feature-specific user-behavior models that are associated with features indicative of user behavior; and
   perform a user-verification process comprising:
      determining a plurality of feature-specific risk-score values, wherein determining each feature-specific risk-score value comprises comparing at least one of the adaptive feature-specific user-behavior models with each respective feature extracted from one or more of the user activities during one of the user sessions on the at least one application server,
      determining a total risk-score value indicative of user non-authenticity by:
      a) weighting and combining the feature-specific risk-score values, wherein the feature-specific risk-score values are combined by a multi-criteria decision analysis technique, and
      b) weighting and combining pre-combined risk-score values, wherein the pre-combined risk-score values are determined by combining a portion of the feature-specific risk-score values using multi-criteria decision analysis, and
      in response to the total risk-score value exceeding a given threshold, performing a corrective action selected from the group consisting of (i) signing out the user, (ii) requesting a two-factor authentication from the user, (iii) locking the user, and (iv) initiating an alert function,
      wherein the user model is adapted on a user-model server based on the user activities associated with different applications on the at least one application server, and the adaptive feature-specific user-behavior models are specific for the different applications.

2. The server system of claim 1 wherein the features are selected from the group consisting of client information, office information, and organization information.

3. The server system of claim 1 wherein the user model is replicated from the user-model server to the at least one application server, and the total risk-score value is determined on the at least one application server using the user model.

4. The server system of claim 1 wherein the features are selected from the group consisting of origins of the user activities, time stamps of the user activities, and durations of the user sessions in which the user activities are performed.

5. The server system of claim 1 wherein the features are time stamps of the user activities, a feature-specific behavior model is associated with the time stamps of the user activities and comprises a Gaussian-mixture model of the time stamps of the user activities, and the feature-specific risk-score value associated with the time stamps of the user activities is calculated based on a complement of probabilities from the Gaussian-mixture model.

6. The server system of claim 1 wherein the features are the durations of the user sessions, a feature-specific behavior model is associated with the durations of the user sessions, and the feature-specific behavior-model maps the durations of the user sessions to (i) a moving average, (ii) a median, (iii) a standard-deviation, or (iv) a quantile.

7. The server system of claim 1 wherein the features comprise a sequence of actions performed by the user, a feature-specific behavior model is associated with the actions and is a Markov chain model, and the feature-specific risk-score value associated with the sequence of actions performed by the user is calculated by determining a complement of the Markov-probability of the sequence extracted from the actions.

8. The server system of claim 1 wherein the feature-specific risk-score values are combined by weighting the score values according to their relative fraud probability.

9. The server system of claim 1 wherein the multi-criteria decision analysis technique is based on a weighted ordered-weighted-average, an ordered-weighted average, or a fuzzy integral of the feature-specific risk-score values.

10. The server system of claim 1 wherein the corrective action is performed in response to a certain feature pattern being detected and regardless of the total risk-score value.

11. A method of monitoring user authenticity during user activities in user sessions on at least one application server, the method comprising:
    performing a user-modeling process in which a user model is adapted session-by-session to user activities, wherein the user model includes a plurality of adaptive feature-specific user-behavior models that are associated with features indicative of user behavior; and
    perform, by one or more processors of the at least one application server, a user-verification process comprising:
       determining a plurality of feature-specific risk-score values, wherein determining each feature-specific risk-score value comprises comparing at least one of the adaptive feature-specific user-behavior models with a respective feature extracted from one or more of the user activities in one of the user sessions on the at least one application server,
       determining a total risk-score value indicative of user non-authenticity by:
       a) weighting and combining the feature-specific risk-score values, wherein the feature-specific risk-score values are combined by a multi-criteria decision analysis technique, and
       b) weighting and combining pre-combined risk-score values, wherein the pre-combined risk-score values are determined by combining a portion of the feature-specific risk-score values using multi-criteria decision analysis, and
       in response to the total risk-score value exceeding a given threshold, performing a corrective action selected from the group consisting of (i) signing out the user, (ii) requesting a two-factor authentication from the user, (iii) locking the user, and (iv) initiating an alert function,
       wherein the user model is adapted on a user-model server based on the user activities associated with different applications on the at least one application server, and the adaptive feature-specific user-behavior models are specific for the different applications.

12. The method of claim 11 wherein the features are selected from the group consisting of client information, office information, and organization information.

13. The method of claim 11 wherein the user model is replicated from the user-model server to the at least one application server, and the total risk-score value is determined on the at least one application server using the user model.

14. The method of claim 11 wherein the features are selected from the group consisting of origins of the user activities, time stamps of the user activities, and durations of the user sessions in which the user activities are performed.

15. The method of claim 11 wherein the features are time stamps of the user activities, a feature-specific behavior model is associated with the time stamps of the user activities and comprises a Gaussian-mixture model of the time stamps of the user activities, and the feature-specific risk-score value associated with the time stamps of the user activities is calculated based on a complement of probabilities from the Gaussian-mixture model.

16. The method of claim 11 wherein the features are the durations of the user sessions, a feature-specific behavior model is associated with the durations of the user sessions, and the feature-specific behavior-model maps the durations of the user sessions to at least one of (i) a moving average, (ii) a median, (iii) a standard-deviation, or (iv) a quantile.

17. The method of claim 11 wherein the features comprise a sequence of actions performed by the user, a feature-specific behavior model is associated with the actions and is a Markov chain model, and the feature-specific risk-score value associated with the sequence of actions performed by the user is calculated by determining a complement of the Markov-probability of the sequence extracted from the actions.

18. The method of claim 11 wherein the feature-specific risk-score values are combined by weighting the score values according to their relative fraud probability.

19. The method of claim 11 wherein the multi-criteria decision analysis technique is based on a weighted ordered-weighted-average, an ordered-weighted average, or a fuzzy integral of the feature-specific risk-score values.

20. The method of claim 11 wherein the corrective action is performed in response to a certain feature pattern being detected and regardless of the total risk-score value.

21. A computer program product for monitoring user authenticity during user activities in user sessions on at least one application server, the computer program product comprising:
a non-transitory computer readable storage medium; and
program code on the non-transitory computer readable storage medium, the program code, when executed by one or more processors, causes the one or more processors to:
perform a user-modeling process in which a user model is adapted session-by-session to user activities, wherein the user model includes a plurality of adaptive feature-specific user-behavior models that are associated with features indicative of user behavior; and
perform a user-verification process comprising:
determining a plurality of feature-specific risk-score values, wherein determining each feature-specific risk-score value comprises comparing at least one of the adaptive feature-specific user-behavior models with a respective feature extracted from one or more of the user activities in one of the user sessions on the at least one application server,
determining a total risk-score value indicative of user non-authenticity by:
a) weighting and combining the feature-specific risk-score values, wherein the feature-specific risk-score values are combined by a multi-criteria decision analysis technique, and
b) weighting and combining pre-combined risk-score values, wherein the pre-combined risk-score values are determined by combining a portion of the feature-specific risk-score values using multi-criteria decision analysis, and
in response to the total risk-score value exceeding a given threshold, performing a corrective action selected from the group consisting of (i) signing out the user, (ii) requesting a two-factor authentication from the user, (iii) locking the user, and (iv) initiating an alert function,
wherein the user model is adapted on a user-model server based on the user activities associated with different applications on the at least one application server, and the adaptive feature-specific user-behavior models are specific for the different applications.

* * * * *